(12) United States Patent
Woldahl et al.

(10) Patent No.: US 12,549,466 B2
(45) Date of Patent: *Feb. 10, 2026

(54) SYSTEMS AND METHODS FOR IDENTIFYING DEFECTS IN LOCAL LOOPS

(71) Applicant: Level 3 Communications, LLC, Denver, CO (US)

(72) Inventors: Thomas C. Woldahl, Phoenix, AZ (US); Leigh A. Benson, Nederland, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/751,230

(22) Filed: Jun. 22, 2024

(65) Prior Publication Data
US 2024/0348525 A1    Oct. 17, 2024

Related U.S. Application Data

(63) Continuation of application No. 17/812,858, filed on Jul. 15, 2022, now Pat. No. 12,021,726.

(60) Provisional application No. 63/222,355, filed on Jul. 15, 2021.

(51) Int. Cl.
*H04L 43/10* (2022.01)
*G06N 5/022* (2023.01)

(52) U.S. Cl.
CPC ............. *H04L 43/10* (2013.01); *G06N 5/022* (2013.01)

(58) Field of Classification Search
CPC ......... H04L 43/10; H04L 43/50; G06N 5/022; G06N 20/00; G06N 99/005; G06N 7/005; G06F 11/3409

USPC .......................................................... 709/224
See application file for complete search history.

(56) References Cited

U.S. PATENT DOCUMENTS

| | | | |
|---|---|---|---|
| 7,050,547 B1* | 5/2006 | Beamon | H04M 3/2263 379/27.01 |
| 7,716,011 B2* | 5/2010 | Thibaux | H04L 63/1425 702/179 |
| 11,924,051 B2* | 3/2024 | Villasante Marcos | H04L 41/16 |
| 2002/0044597 A1* | 4/2002 | Shively | H04L 5/0044 370/344 |
| 2002/0072345 A1* | 6/2002 | Toth | H04Q 11/0471 455/348 |

(Continued)

OTHER PUBLICATIONS

Golyandina, Nina et al., "Multivariate and 2D Extensions of Singular Spectrum Analysis with the Rssa Package" arXiv preprint arXiv:1309.5050; Sep. 19, 2013, pp. 1-77.

(Continued)

*Primary Examiner* — James N Fiorillo

(57) ABSTRACT

Automatic testing/analysis of local loops of telecommunications networks includes obtaining bits-per-tone data for a local loop of a telecommunications network and generating a bit value string from the bits-per-tone data. The bit value string is then analyzed to determine whether it includes a bit pattern indicative of an impairment of the local loop. Further approaches for automatically testing local loops of telecommunications networks include obtaining attenuation data for multiple tones carried by the local loop and determining whether the attenuation data falls below thresholds for providing a service using the local loop.

17 Claims, 9 Drawing Sheets

(56) References Cited

U.S. PATENT DOCUMENTS

| | | | | |
|---|---|---|---|---|
| 2003/0043753 | A1* | 3/2003 | Nelson | H04M 3/303 |
| | | | | 370/252 |
| 2004/0078160 | A1* | 4/2004 | Frei | G06F 17/14 |
| | | | | 702/79 |
| 2013/0018624 | A1* | 1/2013 | Bhatnagar | G01R 31/58 |
| | | | | 702/119 |
| 2015/0269050 | A1* | 9/2015 | Filimonov | G06Q 10/0639 |
| | | | | 702/183 |
| 2017/0111209 | A1* | 4/2017 | Ward | H04L 12/4633 |
| 2017/0180549 | A1* | 6/2017 | Zahedi | H04L 41/0677 |
| 2021/0298687 | A1* | 9/2021 | Hariton | A61B 5/7267 |
| 2022/0385543 | A1* | 12/2022 | Villasante Marcos | |
| | | | | H04L 43/0858 |
| 2023/0013462 | A1* | 1/2023 | Woldahl | G06N 5/022 |

OTHER PUBLICATIONS

Oropeza, Vencente et al., "Simultaneous seismic data denoising and reconstruction via multichannel singular spectrum analysis", *Geophysics* vol. 76, No. 3; May-Jun. 2011, pp. V25-32.

\* cited by examiner

FIG. 3

SYSTEMS AND METHODS FOR IDENTIFYING DEFECTS IN LOCAL LOOPS

CROSS-REFERENCE TO RELATED APPLICATIONS

This application is related to and claims priority under 35 U.S.C. § 119(e) from U.S. Patent Application No. 63/222,355, filed Jul. 15, 2021 entitled "Systems and Methods for Identifying Defects in Local Loops," the entire contents of which is incorporated herein by reference for all purposes.

This application is related to U.S. patent application Ser. No. 17/128,737, filed Dec. 21, 2020 and titled "Systems, Methods, and Storage Media for Testing Local Loops of Telecommunication Networks", which is a divisional of U.S. patent application Ser. No. 16/680,275, filed Nov. 11, 2019, titled "Systems, Methods, and Storage Media for Testing Local Loops of Telecommunication Networks", and now U.S. Pat. No. 10,880,430, which is related to and claims priority under 35 U.S.C. § 119(e) from U.S. Patent Application No. 62/768,589, filed Nov. 16, 2018, titled "Systems, Methods, and Storage Media for Automatically Identifying Impairments in Local Loops of Telecommunication Networks." The entire contents of each of the foregoing applications and patents are incorporated herein by reference for all purposes.

FIELD OF THE DISCLOSURE

The present disclosure relates to systems, methods, and storage media for automatically identifying impairments in local loops of telecommunications networks.

BACKGROUND

Copper-based telecommunications systems, such as digital subscriber line (DSL) systems, transmit information by sending electrical signals over a copper wire. Such systems may be used in conjunction with traditional telephone services and/or may make use of existing telephone lines from which telephone services have been migrated.

In general, copper-based telecommunications systems may include one or more modems or similar transceivers corresponding to end users (e.g., customers) of the telecommunications system. Each transceiver is typically connected by a wired connection, in what is typically referred to as a local loop, to a switch or similar piece of network equipment for receiving communications from the transceiver and transmitting the communications over a broader network backbone. In the context of DSL, for example, the transceiver associated with the end user is generally a DSL modem. The network equipment, to which the DSL modem is connected by the local loop, may be a DSL access multiplexer or "DSLAM". Each local loop may support multiple transceivers and a given DSLAM may be connected to multiple local loops.

Communication over the local loop generally includes transmitting data using a frequency division multiplexed signal consisting of multiple channels spread across a particular frequency band. Each channel is adapted to transmit, among other things, a respective carrier signal to which bits of data may be added for transmission between devices of the telecommunications network.

Various factors may affect the reliability, consistency, and quality of communications that occur over the local loop. For example, under certain operating conditions, a loss or reduction of the available frequency band or the number of bits transmitted over each channel may occur. Certain conditions may also result in, among other things, excessive noise on the line or other issues impacting the overall performance of the telecommunications network. In light of the foregoing, systems and methods for readily identifying and diagnosing such conditions in order that they may be remediated are desirable.

It is with these observations in mind, among others, that aspects of the present disclosure were conceived.

SUMMARY

Aspects of the present disclosure relate to systems and methods for analyzing local loops of telecommunications networks. In general, the systems and methods disclosed herein include the steps of obtaining trace data for a local loop of a telecommunications network and decomposing the trace data to generate a subsignal. The systems and methods further include extracting features from the trace data and the subsignal and providing the features to a classifier, wherein the classifier identifies a class of the local loop based on the features, and wherein the class corresponds to a local loop status indicating a presence of a defect of the local loop.

In some aspects, the trace data includes at least one of bits-per-tone data, signal-to-noise ratio data, quiet-line-noise data, or hlog data. In some aspects, decomposing the trace data to generate the subsignal includes applying a singular spectral analysis to the trace data and the subsignal is an empirical orthogonal function. In other aspects, decomposing the trace data to generate the subsignal includes decomposing the trace data into a plurality of initial subsignals and combining the plurality of initial subsignals to generate the subsignal.

In various possible implementations, the method may further involve transmitting an indicator corresponding to the status. When the indictor is received by a computing device, the indicator may cause the computing device to display the status and, when a defect is present, to provide access to technical information for resolving the defect.

In various possible aspects, the classifier includes one or more machine learning models. In such aspects, providing the features to a classifier includes providing the features to each of the one or more machine learning models.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings include features meant to emphasize the features and principles of the technological concepts of the various embodiments. The drawings depict only typical embodiments of the present disclosure and, therefore, are not to be considered limiting in scope.

FIG. 3 is an example block of bits-per-tone data.

DETAILED DESCRIPTION

Aspects of the present disclosure involve systems and methods for monitoring local loops in a copper-based telecommunications system and identifying impairments in such local loops that may negatively impact the performance of the telecommunications system. In certain implementations, such systems may be implemented, at least in part, at a local loop testing system in communication with one or more network devices including, without limitation, digital subscriber line (DSL) access multiplexers (DSLAMs), or portable testing equipment. During operation, the local loop testing system is configured to obtain bits-per-tone data from a local loop and to analyze the bits-per-tone data for particular patterns indicative of various impairments that may be present on the local loop. For example, and without limitation, such impairments may include alien ingress, a bridge tap, a noise floor above a particular threshold value, and/or upstream pressure. In one example implementation, the analysis by the local loop testing system is performed, in part, by converting the bits-per-tone data into a string and comparing or otherwise testing the string against a template that includes bit patterns indicative of the various impairments.

Although the systems and methods discussed herein are primarily described as being implemented using a local loop testing system, some or all of the functionality for testing impairments may alternatively be implemented within network devices (e.g., within a DSLAM), testing equipment, or any other computing device arranged to perform the operations described herein. Accordingly, to the extent any steps, operations, etc. are described as being performed by the local loop testing system, it should be understood that such functionality may be executed more generally by one or more devices within or coupleable to a network or that may otherwise have access to the performance data underlying the impairment identification approaches discussed herein.

Figure 1:
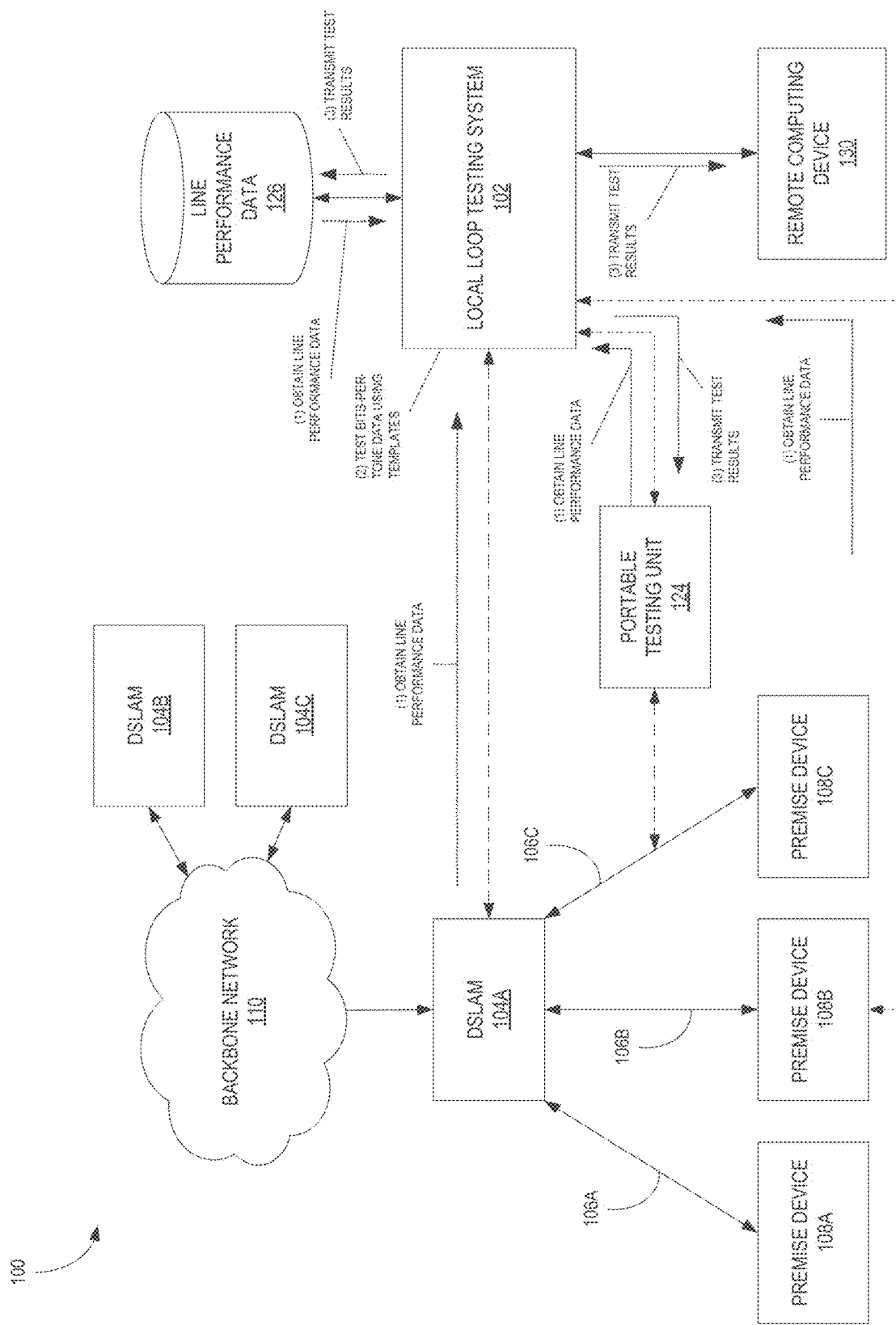
FIG. 1 illustrates a system configured for automatically identifying impairments in local loops of telecommunications networks, in accordance with one or more implementations.

FIG. 1 illustrates a network environment 100 according to one or more implementations of the present disclosure. The network environment 100 includes an local loop testing system 102 configured to automatically identifying impairments in circuits of telecommunications networks, such as local loops, based on line performance data for the circuits. Although implementations of the present disclosure are generally applicable to telecommunications networks having any suitable configuration, the network environment 100 of FIG. 1 is provided as an example to lend context to the following discussion. Accordingly, the network environment 100 should be considered as one example environment within which aspects of the present disclosure may be implemented and should not be viewed as limiting.

As illustrated, the network environment 100 includes a backbone network 110 in communication with multiple bridge devices, namely, digital subscriber line (DSL) access multiplexers (DSLAMs) 104A-104C. In general, DSLAMs 104A-104C facilitate communication between the high-speed backbone network 110 and local loops of the telecommunications network, such as local loops 106A-106C, which are shown as being in communication with DSLAM 104A. More specifically and with reference to DSLAM 104A, the DSLAM 104A collects and combines traffic from network devices, such as premise devices 108A-108C, connected to the local loops 106A-106C for transmission over the backbone network 110 and distributes traffic received from the backbone network 110 to the appropriate local loops 106A-106C.

While the network environment 100 of FIG. 1 illustrates only three DSLAMs 104A-104C, it should be understood that any suitable number of DSLAMs may be in communication with the backbone network 110. Similarly, each DSLAM may be connected to any number of local loops, each of which may be connected to a respective premise device. For example, DSLAMs 104B and 104C may be coupled to one or more respective local loops; however, for clarity, such local loops are omitted from FIG. 1. Moreover, it should be further appreciated that implementations of the present device are not necessarily limited to those including DSLAMs as bridge devices. Rather, as discussed below, implementations of the present device are directed to analyzing and assessing impairments on the local loops 106A-106C. Accordingly, implementations of the present disclosure may include any suitable bridge device for connecting one or more local loops or similar circuits to another network.

A given local loop may be or may become subject to one or more impairments that may negatively impact, bandwidth of the local loop, transmission speed, data quality, and the like. Accordingly, each local loop may be periodically tested to determine whether any such impairments are present. One approach to detecting such impairments is to sample and analyze bits-per-tone data for the local loop. Bits-per-tone data refers to analysis data indicating the number of bits carried by each available tone of the local loop, with each tone corresponding to a range of the total bandwidth of the local loop. For example, in certain applications, each tone may correspond to approximately 4.3 kHz and may carry up to 15 bits. Various impairments affect the bits-per-tone data differently, e.g., by creating gaps or patterns in adjacent frequency bands of the bits-per-tone data. Accordingly, by examining the bits-per-tone data and identifying impairment-related patterns within the bits-per-tone data, impairments may be identified and classified and corresponding remedial actions (e.g., line repairs, equipment replacement, etc.) may be initiated.

Figure 2:
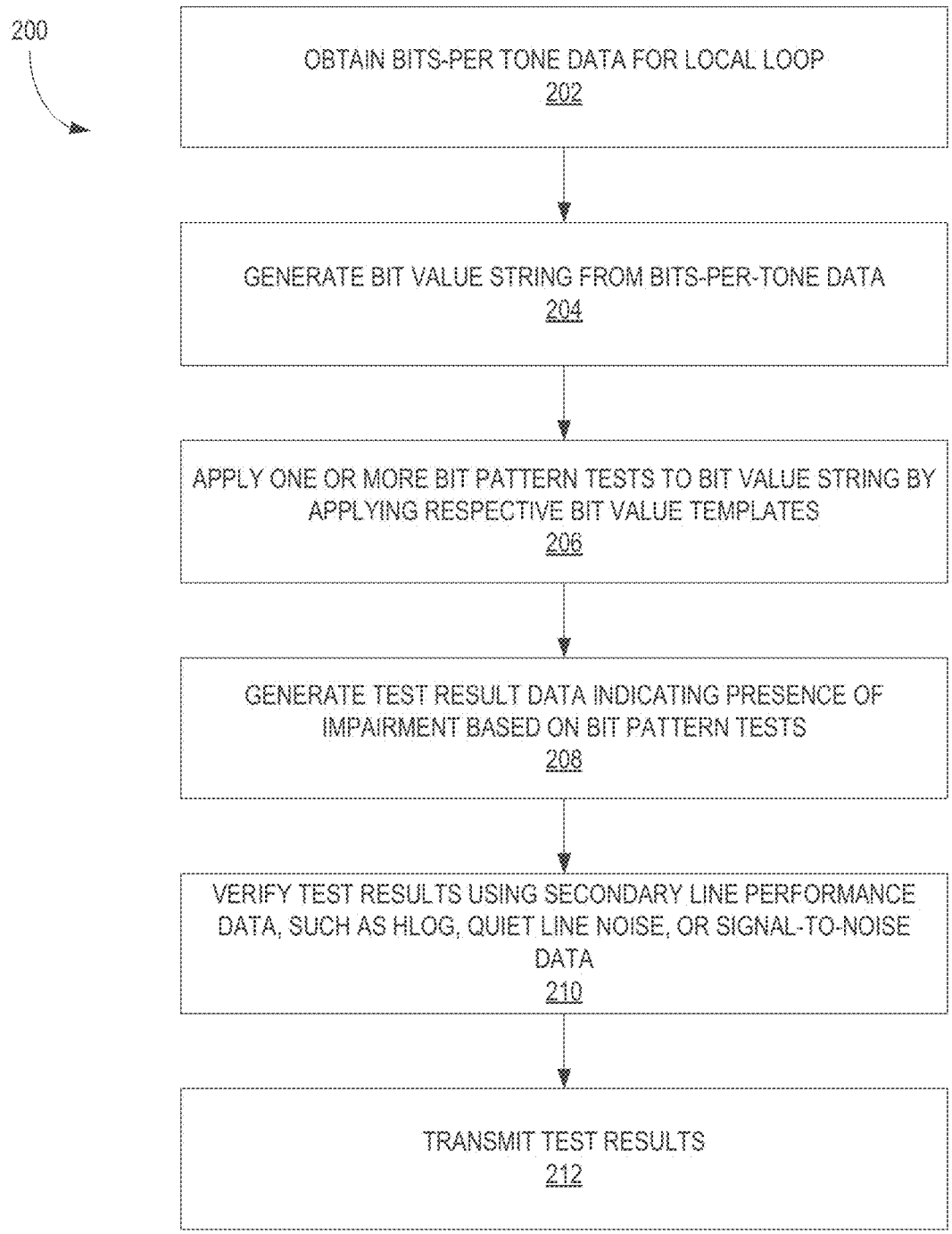
FIG. 2 illustrates a method for automatically identifying impairments in local loops of telecommunications networks, in accordance with one or more implementations.

FIG. 2 is a flow chart illustrating a method 200 for detecting impairments in local loops of telecommunications networks in accordance with the present disclosure. In general, the method 200 involves collecting, processing, and analyzing bits-per-tone data for local loops to identify bit patterns indicative of particular impairments affecting the local loops. To provide context, the method 200 is described below with reference to the network environment 100 of FIG. 1 and, more specifically, is described in the context of testing the local loops 106A-106C. Nevertheless, it should be appreciated that the method 200 may generally be applied for testing any link or circuit of a network for which bit-per-tone data may be collected.

At operation 202, the local loop testing system 102 obtains line performance data including bits-per-tone data for one or more local loops 106A-106C. Bits-per-tone data may be collected using various techniques. In general, the local loop testing system 102 obtains the line performance data either directly from devices within the network environment 100, from testing devices in communication with the local loop testing system 102, or from a data source of historical line performance data (e.g., line performance data source 126). For example, in certain implementations, the DSLAM 104A may be configured to periodically collect bits-per-tone data for one or more of the local loops 106A-106C connected to the DSLAM 104A. The collected line performance data may then be transmitted to the local loop testing system 102 for storage in a line performance data source 126. Alternatively, the collected line performance data may be transmitted and stored in the line performance data source 126 for subsequent access by the local loop testing system 102 by the DSLAM 104A or one or more other computing systems in communication with the DSLAM 104. In still other implementations, the bits-per-tone data may be collected and provided to the local loop testing system 102 (or other computing system for storage in the line performance data source 126) by a portable testing unit 124 capable of obtaining bits-per-tone data from the local loops 106A-106C. In other implementations, a premise device (e.g., premise device 108B) capable of collecting bits-per-tone data for the local loop (e.g., local loop 106B) may provide the bits-per-tone data to the local loop testing system 102 (or a data source accessible by the local loop testing system 102.

In addition to bits-per-tone data, the line performance data corresponding to the local loops 106A-106C may include other data that may be used by for subsequent access by the local loop testing system 102 to further test and verify the performance of the local loops 106A-106C. By way of non-limiting example, such additional data may include at least one of Hlog data, quiet line noise data, and signal-to-noise ratio data. Similar to the bits-per-tone data, such additional data may be collected and made available to the local loop testing system 102 by one or more devices such as, but not limited to, the DSLAM 104A, the portable testing unit 124, and premise devices 108A-108C.

The line performance data obtained in operation 202 may be in various forms and formats based on the type of device collecting the line performance data and/or the approach used to store the line performance data. In general, however, the line performance data includes bits-per-tone data that indicates a quantity of bits for each of a series tones. Accordingly, the bits-per-tone data may be stored and retrieved as an array, table, string, or similar data structure from which bit counts for specific tones may be identified. In certain implementations, the line performance data including the bits-per-tone data may be in a comma-separated value (CSV) file or similar tabular file format. In other implementations, the line performance data may be received as an extensible markup language (XML) file or similar format that similarly facilitates identification and extraction of particular data from the file by including specific fields identifying particular type of data.

In certain implementations, obtaining the line performance data may include transmitting a request for line performance data from the local loop testing system 102 to a network device capable of collecting such information for a local loop. For example, in the network environment 100, the local loop testing system 102 may transmit a request for line performance data for one, multiple, or all local loops to DSLAM 104A. In response, the DSLAM 104A may transmit one or more corresponding response messages, including the requested line performance data, to the local loop testing system 102.

In certain implementations, the request message from the local loop testing system 102 may be configured to cause the receiving network device to initiate a line performance test and to collect line performance data, including bits-per-tone data. In other implementations, the network device may be configured to periodically sample or otherwise collect line performance data independent of a specific request from the local loop testing system 102. In such implementations, in response to receiving a request form the impairment testing system 102, the network device may provide the most recently collected line performance data to the local loop testing system 102.

Subsequent to obtaining the line performance data, the local loop testing system 102 generates a bit value string from the bits-per-tone data (operation 204). For example, in certain implementations, the local loop testing system 102 may concatenate the bits-per-tone data into a string of consecutive hexadecimal values with each value corresponding to the number of bits for a respective tone. Accordingly, the bit value string generally includes each of the bit values of the bits-per-tone data by tone frequency in sequential order.

For example, as previously noted, the bits-per-tone data may include the quantity of bits (e.g., up to 15) for each of a plurality of consecutive tones at 4.3 kHz intervals. In such an implementation, a set of ten consecutive 4.3 kHz intervals may result in counts of 9, 10, 9, 8, 12, 14, 12, 10, 9, and 6 bits, respectively. Accordingly, to generate the bit value string, the local loop testing system 102 may receive the bit counts and may convert and store the bit counts as a string. Using the foregoing example sequence of bits, the local loop testing system 102 would generate the bit value string "9A98CECA96".

The local loop testing system 102 may then test the bit value string using one or more bit value templates (operation 206) and generate a corresponding test result (operation 208). In general, the one or more bit value templates facilitate identification of a bit value pattern indicative of an impairment within the bit value string. For example and without limitation, the bit value template may be in the form of a search string, regular expression, or similar search or character pattern that may be compared to the bit value string to determine if at least a portion of the bit value string conforms to the search pattern. More generally, the bit value template may be any sequence or pattern of bit values that the local loop testing system 102 is configured to identify within the bit value string. Accordingly, a test result generated by the local loop testing system 102 for a given bit value template may indicate whether at least a portion of the bit value string conforms to the bit value template (e.g., includes the sequence of bit values represented by the bit value template). For example, a "positive" test result may indicate that at least a portion of the bit value string conforms to the bit value template while a "negative" result may indicate that the bit value string does not include the pattern or sequence of bits represented by the bit value template. In certain implementations, testing of the bit value string may include applying multiple bit value templates to the bit value string and generating multiple test results. For example, each of the multiple bit value templates and test results may correspond to a different type of impairment. By way of non-limiting example, such impairments may include one or more of alien ingress, a bridge tap, mixed technology connected to the local loop, a noise floor above a threshold value, or upstream pressure.

In one example, the local loop testing system 102 may test the bit value string using a bit value template for identifying alien ingress. In at least certain cases, alien ingress may be identified by bands within the bits-per-tone data for which zero bits are received. So, for example, a bit value template for testing for alien ingress may check for portions of the bit value string in which a series of tones having relatively high bit counts (e.g., four or greater) is followed by a band of one or more tones having a bit count of zero, followed by a subsequent band of tones for which relatively high bit counts are again observed.

As another example, the local loop testing system 102 may test the bit value string using a bit value template for identifying bridge taps. In at least certain cases, bridge taps may be identified by bands of the bits-per-tone data in which the bit counts for successive tone ranges decrease over a first band of tones and then increase over a second, consecutive band. When plotted in a bits-per-tone graph, for example, the bridge tap may appear as consecutive series or steps in opposite directions (e.g., a set of downward or upward steps followed by a corresponding set of upward or downward steps, respectively) or stepped crenellations. Accordingly, a search pattern for identifying bridge taps may be configured to identify portions of the bits-per-tone data in which the bit count decreases in a step-like fashion over a first band and then increases in a similar step-like fashion over a second, adjacent band.

As still another example, the local loop testing system 102 may test the bit value string using a bit value template for identifying mixed technology. For purposes of this disclosure, mixed technology generally refers to instances in which the same local loop provides services using multiple, disparate technologies (e.g., a ADSL with ADSL2 or VDSL technologies). Among other things, identification of mixed technology impairments enables an operator to identify old or obsolete technology within a network and for which replacement with newer, improved technology may result in a better overall customer experience. In at least certain cases, mixed technology may be identified from the bits-per-tone data using a search pattern that identifies increasing bits-per-tone values over a range of relatively low-frequency tones. For example, mixed technology may be identified by a search pattern that identifies a gradual increase in the bits-per-tone values over the first 256 bins of the bits-per-tone data (e.g., the bits-per-tone measured for tone frequencies up to approximately 1.1 MHz).

In yet another example, the local loop testing system 102 may test the bit value string using a bit value template for identifying upstream pressure. For purposes of this disclosure, upstream pressure refers to instances in which data is transported upstream using bands that are not generally intended for such data transport. As discussed below in further detail, tones carried by a local loop may be divided into multiple bands dedicated to upstream and downstream data transport. For example, a VDSL circuit may include at least three bands for upstream data transport (e.g., U0, U1, U2) with only two such bands (e.g. U1, U2) providing the primary data transport. To the extent the third band (e.g., U0) is used, such overflow may be the result of attenuation of the circuit in one of the other two bands. In at least certain cases, upstream pressure may be identified using a search pattern that identifies a sudden increase in bits-per-tone values across a small band. For example and without limitation, in at least one implementation, the local loop testing system 102 may identify the presence of upstream pressure by using a search pattern that identifies a first band where each tone has zero bits, a second band (e.g., of approximately 10-30 tones) immediately following the first band for which the bits-per-tone data exceeds a predetermined value (e.g., 5 bits), and a third band immediately following the second band where each tone again has zero bits. It should be appreciated that the length of each of the bands and the predetermined value used in the search pattern may vary in different implementations of the present disclosure. Among other things, the definitions of the bands may vary depending on the technology implemented using the local loop (e.g., ADSL, VDSL, VDSL2, etc.) and their respective band definitions. It should also be appreciated that certain technologies (e.g., VDSL) may support multiple band definitions/configurations. In such cases, the search pattern may also vary or otherwise be dependent on the particular configuration for the technology.

In another example, the local loop testing system 102 may test the bit value string using a bit value template for identifying a noise floor. A noise floor generally refers to when erroneous background transmissions emitted by other devices or sources create interference on frequencies carried over the local loop. In general, a noise floor may be identified by one or more bands in the bits-per-tone data for which each tone has a relatively low bits-per-tone value. For example, in at least certain cases, a noise floor may be considered to be present when each tone of the bits-per-tone data for a band of approximately 2.5-3.5 MHz is seven bits or less. Nevertheless, it should be appreciated that the width of the band, the number of bits used for the threshold, or similar aspects of the bit pattern may vary in implementations of this disclosure. Among other things, the width or range of the band tested using the search pattern may depend on defined bands for the particular data transport technology implemented using the local loop. In such instances, the search pattern may be used to test for a noise floor within a specific upstream or downstream band as defined for the data transport technology. As another example, the threshold number of bits for identifying a noise floor for the search pattern may vary based on a desired quality of service/speed for the local loop and, as a result, the necessary sensitivity to noise on the local loop.

Figure 3:
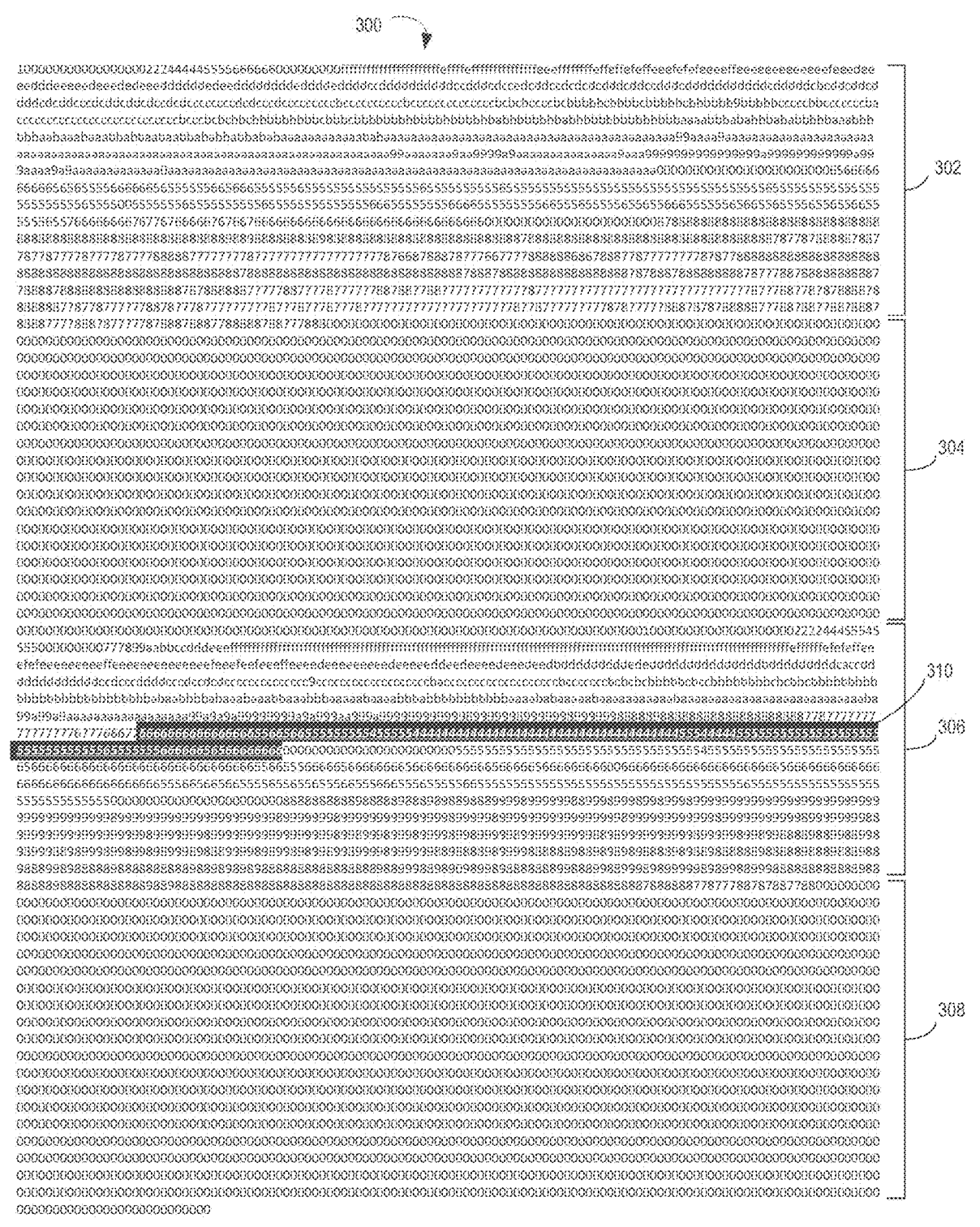

To illustrate the general complexity of identifying patterns within hexadecimal representations of bits-per-tone data, an example of such data for an example loop is provided in FIG. 3. More specifically, FIG. 3 is a block of bits-per-tone data 300 that has been converted into hexadecimal values for analysis (e.g., as may be produced in operation 204, above). Each digit of the block 300 corresponds to the number of measured bits for a tone spanning approximately 4.3 kHz. Accordingly, when read from left-to-right and top-to-bottom, the bits-per-tone block 300 provides the number of bits carried by each 4.3 kHz tone supported by the loop.

As illustrated in FIG. 3, the block 300 includes a first portion 302 of non-zero values corresponding to a first downstream frequency band (e.g., a "D1" band), a first portion 304 of zeroes corresponding to a first upstream frequency band (e.g., a "U1" band), a second portion 306 of non-zero values corresponding to a second downstream frequency band (e.g., a "D2" band), and a second portion 308 of zeroes corresponding to a second upstream frequency band (e.g., a "U2" band). Accordingly, the block 300 generally corresponds to bits-per-tone data obtained during a downstream test of the loop; however, it should be appreciated that the systems and method disclosed herein may be used to identify impairments in any frequency band of the loop.

The block 300 indicates an impairment in the form of a bridge tap. More specifically, the block 300 indicates a bridge tap 310 within the second downstream band (D2). For clarity, the bridge tap 310 is highlighted. As noted above, bridge taps may be identified by a step-wise decrease followed by a step-wide increase (or vice-versa) in the number of bits-per-tones measured over successive tones. In the case of the bridge tap 310, such a pattern is evidenced by the values of the bits-per-tone data generally decreasing then subsequently increasing. More specifically, the portion of the block 300 corresponding to the bridge tap 310 includes a series of sixes, followed by a series including a mixture of fives and fours, which in turn is followed by a series of fours. The values then increase back up to a mix of fours and fives, followed by a series that is predominantly fives, which in turn is followed by a series of tones that is predominantly sixes, before subsequently increasing back to a consecutive series of sixes.

Figure 4:
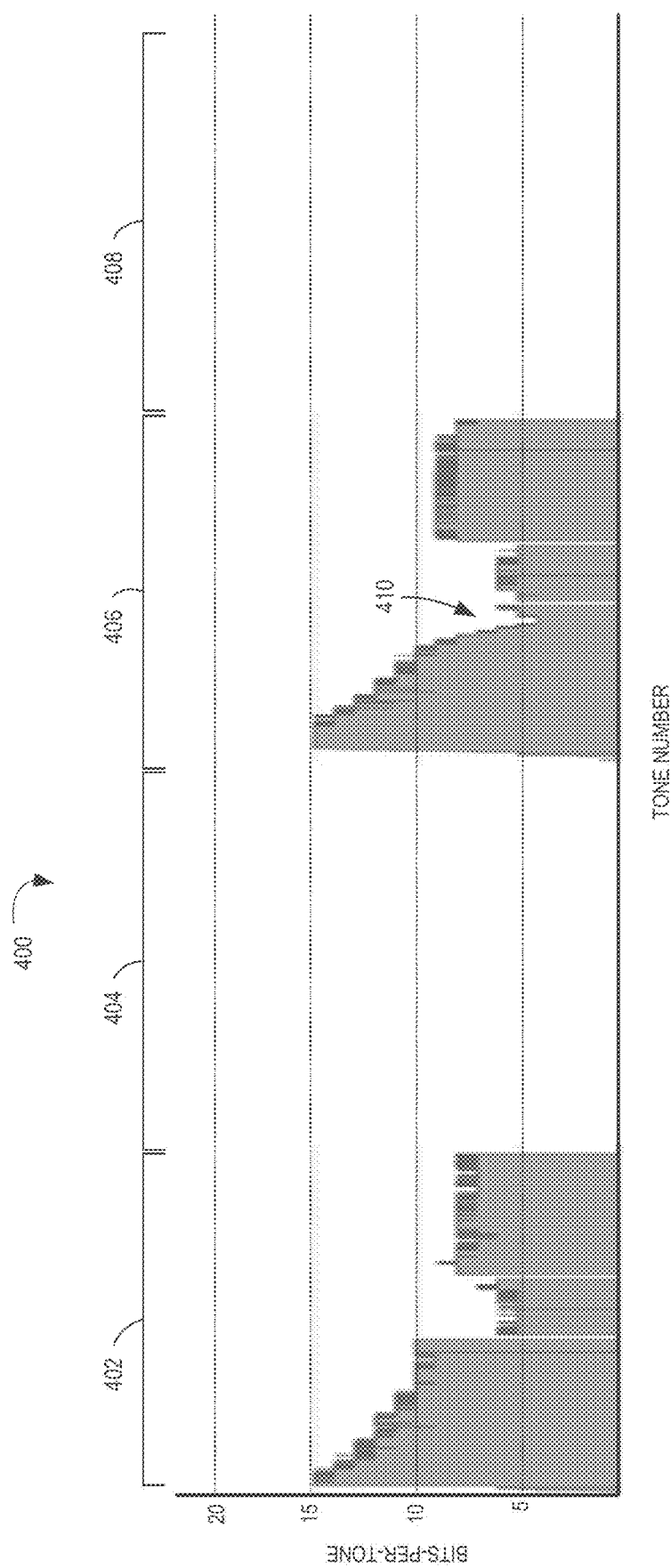
FIG. 4 is a graphical representation of the example block of bits-per-tone data of FIG. 3.

To further illustrate the bridge tap 310 identified in FIG. 3, a graphical representation 400 of the block 300 of FIG. 3 is provided in FIG. 4. As illustrated, the graphical representation 400 includes a first downstream section 402 corresponding to the D1 band, a first upstream section 404 corresponding to the U1 band, a second downstream section 406 corresponding to the D2 band, and a second upstream section 408 corresponding to the U2 band. The bridge tap 310 is identified by reference 410 and, as noted above, appears as a series of downward steps followed by upward steps in the visual representation.

As illustrated in the block 300 of FIG. 3 and the graphical representation 400 of FIG. 4, various aspects of the "steps" used in identifying a bridge tap may vary. For example, the width of each step (e.g., the number of tones included in a given step) may vary. In such cases, the search pattern for identifying a bridge tap may be configured to identify steps of varying sizes (e.g., to identify steps that are anywhere from 10-50 tones in width). As another example, each tone within a given step may have a constant bits-per-tone value; however, in certain instances, a given step may have a predominant value (e.g., 4) but may nevertheless include tones having bits-per-tone values that are higher or lower than the predominant value.

The local loop testing system 102 may also be configured to perform secondary verification (operation 210) of the test results generated in operation 208. Secondary verification may be performed, for example, by analyzing additional data and metrics included in the line performance data. Such additional data may include, among other things, Hlog data, quiet line noise (QLN) data, and signal-to-noise ratio (SNR) data. Notably, the foregoing approach of identifying impairments using bits-per-tone data is inherently dynamic in that the bits-per-tone data is based on the specific time at which the bits-per-tone data is acquired from the local loop. In at least certain implementations, the secondary data may instead reflect a static state of the local loop and, as a result, be used to complement the dynamic bits-per-tone data. By doing so, impairments identified by the bits-per-tone data may be confirmed or recharacterized using the secondary data. In one specific example, certain sources of interference on a local loop (e.g., AM radio, cell towers, aircraft radios, ham radios, etc.) may vary based on time of day and may result in different bits-per-tone data depending on when the bits-per-tone data is collected. In such cases, the characteristics of the interference at the time of sampling the bits-per-tone data may cause the bits-per-tone data to exhibit one type of impairment (e.g., a bridge tap) when in fact a second type of impairment (e.g., an alien ingress) is present. The secondary data may then be used to verify whether a particular type of impairment is actually present. For example, in instances where the bits-per-tone data exhibits a bridge tap, QLN or Hlog data may be used to verify whether a bridge tap is actually present (e.g., as indicated by a characteristic "bounce" in the QLN or Hlog data) or if the results of analyzing the bits-per-tone data is instead the result of alien ingress (e.g., as indicated by spikes or similar characteristic changes at frequencies corresponding to common sources of interference).

Following generation of the test results in operation 208 and secondary verification 210, the local loop testing system 102 may transmit the test results (or a summary thereof) to one or more computing devices (operation 212). In certain implementations the local loop testing system 102 may be configured to transmit the test results to the portable testing unit 124 and the portable testing unit 124 may be configured to automatically display the test results when received. For example, in one implementation, a field technician or similar user may use the portable testing unit 124 to probe the local loop 106C and collect line performance data including bits-per-tone data directly at the portable testing unit 124. Alternatively, the portable testing unit 124 may be communicatively coupled to the DSLAM 104A and may be use to initiate collection of the line performance data by the DSLAM 104A. In either case, the line performance data may then be transmitted to the local loop testing system 102 where the bits-per-tone data may be tested to identify impairments in the local loop 106C, as discussed above. The results of such testing may then be transmitted back to the portable testing unit 124 by the local loop testing system 102 and presented on a display of the portable testing unit 124 or otherwise made available through the portable testing unit 124.

In certain implementations, the local loop testing system 102 may also be configured to transmit one or more of the test results or a summary thereof to another computing device (e.g., remote computing device 130) communicatively coupled to the local loop testing system 102. For example, the remote computing device 130 may correspond to a network operations center from which the network environment 100 may be monitored and controlled. In such implementations, the local loop testing system 102 may also be configured to receive and execute commands from the remote computing device. For example, in one implementation, the remote computing device 130 may transmit instructions to the local loop testing system 102 to initiate testing of one or more local loops. In response, the local loop testing system 102 may coordinate testing, collection, and analysis of line performance data, such as by engaging in communication with one or more devices in the network environment 100 capable of collecting line performance data, as discussed above.

In still other implementations, the local loop testing system 102 may be configured to transmit the test results for storage, e.g., in the line performance data source 126. Test result data may be stored along with other information, such as network architecture or geographic information to facilitate further analysis and diagnostics of the network environment 100. For example, test results for a given local loop may be stored with geographic information associated with the local loop, such as the location of the local loop. Such information may then be used to generate maps in which the status of each local loop (e.g., whether or not impairments are present) is visually indicated, such as by color-coding lines on the map corresponding to the local loops. As another example, test results may be grouped/correlated and analyzed based on geographic or logical address information to facilitate identification of potential impairments in related local loops, to provide statistical information regarding related local loops, and the like.

As discussed above, implementations of the present disclosure may be used to identify particular impairments in local loops of telecommunications networks. In other aspects of the present disclosure, methods and systems according to the present disclose may also (or alternatively) be used to test overall performance of local loops based on attenuation. Such tests may be used to identify, among other things, whether an impairment may be present, whether a local loop is currently providing a certain bitrate, whether a local loop is capable of supporting additional connections or increased bit rates, and the like.

General condition and transport capacity of a local loop may be tested, in part, by measuring attenuation for the local loop. For purposes of this disclose, attenuation generally refers to signal loss or degradation over the local loop and is often expressed in units of decibels (dB) lost. In general, the greater attenuation over a local loop, the lower the transport capacity of the local loop. While some attenuation is inherently caused by the type and length of the transmission medium of the local loop, impairments (such as those discussed above) and other similar factors may result in attenuation above and beyond that which may be inherent to the local loop. As a result, the general condition of the local loop can be analyzed by comparing measured attenuation for the local loop with corresponding benchmarks (e.g., attenuation for an idealized loop having no impairments).

To test the transport capacity of a given local loop, attenuation may be measured at a predetermined test frequency (e.g., 196 kHz). The measured attenuation value at the test frequency may then be compared with a benchmark to determine whether the attenuation at the test frequency falls outside of acceptable an acceptable range. Relying on attenuation at only one frequency can be problematic for various reasons. Among other things, modern DSL lines often have the capacity to carry over 4000 distinct tones extending over a wide frequency spectrum. Accordingly, measuring attenuation for one tone only represents a very small sample size that is unlikely to accurately and fully represent attenuation characteristics of a given local loop over its full bandwidth. Moreover, as noted above in the context of identifying local loop impairments, certain impairments may cause losses in a limited frequency band and, as a result, would not be readily identified by measuring attenuation for a tone outside the particular frequency band associated with the impairment.

In light of the foregoing, implementations of the present disclosure include systems and methods for testing local loops based on measured attenuation values for multiple tones carried over a local loop. Based on the results of such testing, the systems and methods described herein may be used to detect impairments in the local loops, evaluate the transport capacity of the local loops (e.g., for verifying existing services meet specified performance levels or to identify services that may be provided over a given local loop), and perform other similar analyses.

Implementations of the present disclosure collect attenuation (e.g., dB loss) data for multiple tones carried on a local loop. Each attenuation value is then compared to a respective attenuation threshold for the corresponding tone. Although the attenuation thresholds may vary in applications of the present disclosure, in at least certain implementations, the attenuation thresholds may be maximum allowable attenuations for the measured tones. Such maximum allowable thresholds may be based on, among other things, target upstream/downstream bit rates for providing a service (e.g., a service currently provided to a customer or potentially available to a customer), a line type of the local loop, a distance to customer premises, and other similar factors.

In other implementations, the attenuation thresholds may correspond to previously measured attenuation values for the local loop. For example, following installation, upgrading, maintenance, etc., on a local loop (or at any other suitable time), attenuation values may be collected for the local loop and stored as a "baseline" against which subsequently collected attenuation values may be compared. In such implementations, comparing the historical attenuation values to current attenuation values can be used to identify degradation, damage, or other issues associated with the local loop that may impact one or more services provided by the local loop.

Figure 5:
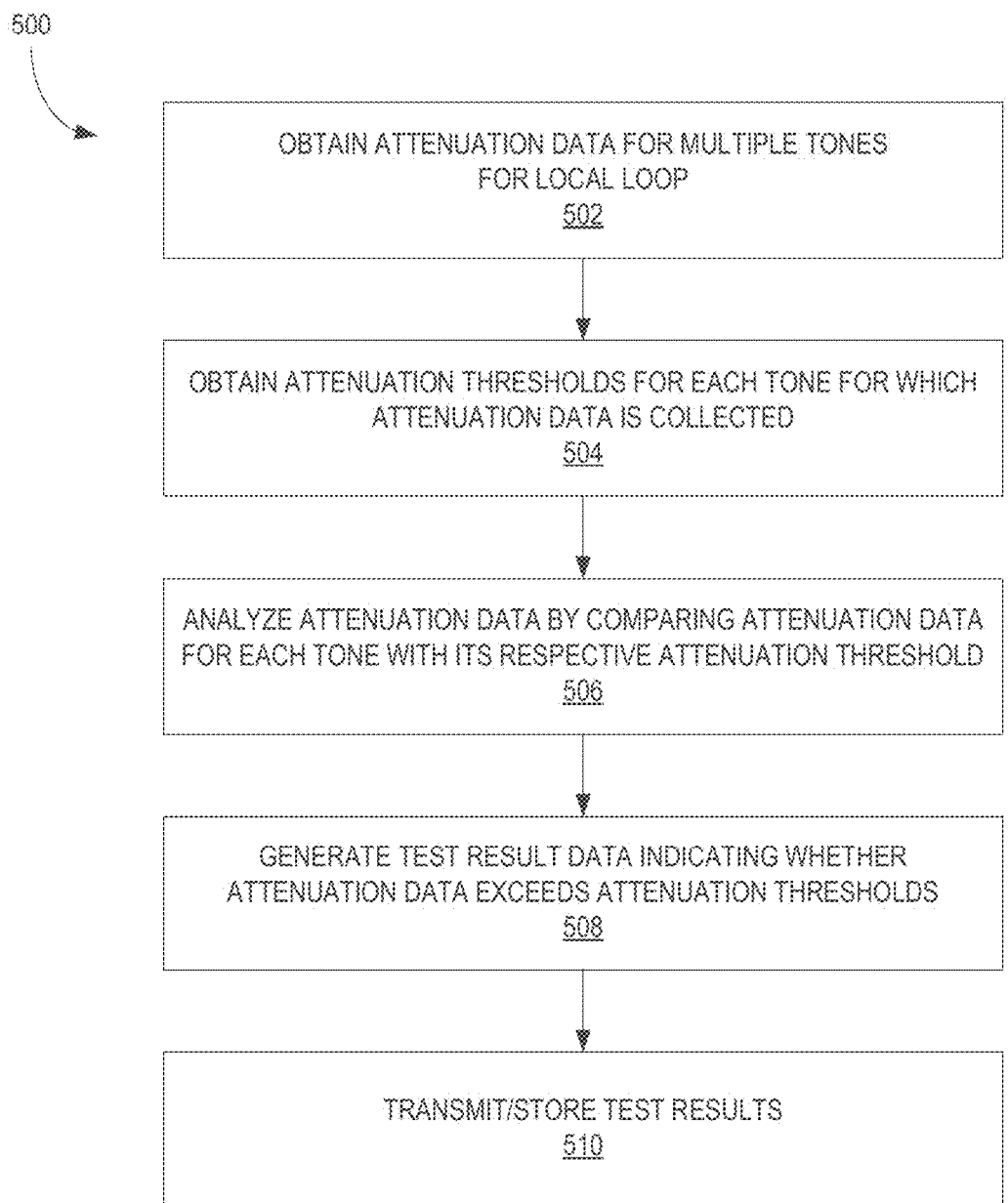
FIG. 5 illustrates a method for analyzing a local loop using attenuation data.

Referring now to FIG. 5, a flowchart illustrating a method 500 for testing a local loop of a telecommunications network is provided. For purposes of the present discussion, reference is made to the network environment 100 of FIG. 1; however, it should be appreciated that implementations of the method 500 are not limited by any particular aspects of the network environment 100 specifically included in FIG. 1. Moreover, while the method 500 is discussed below as being executed by the local loop testing system 102, such an implementation is provided merely as an example and for purposes of explaining various aspects of the present disclosure. In other implementations, the method 500 may be implemented and executed, in whole or in part, by other devices within the network environment 100 or that otherwise have access to information collected from the network environment 100. For example and without limitation, the method 500 may be implemented, in whole or in part, by any of the DSLAMs 104A-104C, the premise devices 108A-108C, the portable testing unit 124, or the remote computing device 130.

At operation 502, the local loop testing system 102 obtains line performance data including attenuation data for multiple tones of one or more of the local loops 106A-106C. In general and similar to the bits-per-tone data discussed above, the local loop testing system 102 may obtain the attenuation data either directly from devices within the network environment 100 (e.g., DSLAMS 104A-104C, premise devices 108A-180C), from testing devices in communication with the local loop testing system 102 (e.g. portable testing unit 124), from a data source of historical line performance data (e.g., line performance data source 126), or in any other suitable way.

The line performance data including the attenuation data obtained in operation 502 may be in various forms and formats based on the type of device collecting the line performance data and/or the approach used to store the line performance data. However, in general, for each local loop for which line performance data is available, the line performance data includes attenuation data that indicates attenuation values for each of a set of tones carried by the local loop. For example, in certain implementations, the attenuation data may include an attenuation value measured in decibels (dB) for each of multiple tones carried by the local loop. In other implementations, the attenuation value may instead be provided in terms of effective feet of line (e.g., the length of line for which a corresponding loss would occur absent any impairments). The attenuation data may be stored and retrieved as an array, table, string, or similar data structure from which losses for specific tones may be retrieved or otherwise identified. In certain implementations, the line performance data including the attenuation data may be in a comma-separated value (CSV) file or similar tabular file format. In other implementations, the line performance data may be received as an extensible markup language (XML) file or similar format that similarly facilitates identification and extraction of particular data from the file by including specific fields identifying particular type of data, including fields for the attenuation data.

The number of tones and specific tone frequencies for which attenuation data is collected may vary; however, in general, attenuation data includes attenuation values for tones of different frequencies. In certain implementations, for example, the local loop testing system 102 may obtain attenuation data for multiple tone frequencies evenly distributed across the full frequency spectrum of the local loop. In other implementations, the local loop testing system 102 may obtain attenuation data for tone frequencies that are unevenly distributed across the frequency spectrum of the local loop. For example, the local loop testing system 102 may obtain attenuation data for tones that are more tightly clustered in frequency bands corresponding to particular impairments (e.g., low frequencies for identifying mixed technology). It should also be appreciated that the specific tone frequencies for which attenuation data is obtained may vary for a given local loop, between different local loops, etc., based on the specific testing needs of an operator of the local loop testing system 102.

In still other implementations, the local loop testing system 102 may be configured to obtain attenuation data for each of a series of predefined frequency bands. For example, as previously discussed in the context of FIG. 4, tones for a local loop may be divided into multiple upstream and downstream bands (e.g., U1/U2 and D1/D2 bands). In such cases, the local loop testing system 102 may be provided with definitions of the bands and may be configured to obtain attenuation data for a set of tones that includes at least one tone representative of each of the predefined frequency bands.

Obtaining the line performance data including the attenuation data may include transmitting a request for line performance data from the local loop testing system 102 to a network device capable of collecting such information for a local loop. For example, in the network environment 100, the local loop testing system 102 may transmit a request for line performance data for one, multiple, or all local loops associated with the DSLAM 104A. In response, the DSLAM 104A may transmit one or more corresponding response messages including the requested line performance data to the local loop testing system 102.

In certain implementations, the request message from the local loop testing system 102 may be configured to cause the receiving network device to initiate a line performance test and to collect line performance data that includes the attenuation data. In other implementations, the network device may be configured to periodically sample or otherwise collect line performance data independent of a specific request from the local loop testing system 102. In such implementations, in response to receiving a request from the impairment testing system 102, the network device may provide the most recently collected line performance data to the local loop testing system 102.

At operation 504, the local loop testing system 102 obtains a set of attenuation thresholds for use in evaluating the collected attenuation data. In certain implementations, the attenuation thresholds may be predetermined benchmarks or similar performance standards for the local loop. For example, the local loop testing system 102 may store or otherwise have access to a database containing sets of attenuation thresholds. Each set of attenuation thresholds may include maximum attenuation values, normal attenuation values, normal attenuation ranges, or any other similar values or ranges of values for assessing whether attenuation for multiple tones of the local loop are each within normal operational ranges. For example, the database may include different sets of attenuation thresholds for different combinations of line types, line lengths, target bitrates, and the like. In certain implementations, the attenuation thresholds may be provided in units of dB loss per foot such that each threshold may be scaled based on the specific length of the local loop being tested. Accordingly, in such implementations, the local loop testing system 102 may obtain the set of attenuation thresholds by performing a lookup to retrieve the particular set of attenuation thresholds corresponding to the local loop to be analyzed and performing any necessary scaling to account for the length of the local loop.

In other implementations, the attenuation thresholds may instead correspond to historical attenuation values obtained for the local loop. For example, in certain implementations, attenuation thresholds may correspond to initial attenuation values measured following installation/setup of the local loop. Similarly, the attenuation thresholds may instead correspond to attenuation values that are periodically measured/collected for the local loop. In either case, the attenuation thresholds are based on historic performance of the local loop and, as a result, can provide a specific benchmark against which subsequent attenuation values may be measured.

Similar to the attenuation data collected in operation 502, the attenuation thresholds may be expressed in various units. For example and without limitation, in certain implementations, the attenuation thresholds may be expressed as losses in dB. In other implementations, the attenuation thresholds may be expressed as equivalent or effective feet of line.

It should be appreciated that the specific tones of the loss data and the specific tones for which attenuation thresholds are available may not coincide. In such implementations, the local loop testing system 102 may generate one or more new attenuation thresholds. To do so, the local loop testing system 102 may interpolate between or extrapolate from available attenuation thresholds to calculate an attenuation threshold for any attenuation value for which an existing attenuation threshold is unavailable.

As noted above, the attenuation thresholds may be dependent on particular characteristics of the local loop being tested. Among other things, each of the line type and the line length of the local loop can impact attenuation. Accordingly, in certain implementations, the local loop testing system 102 may have access to or otherwise obtain information regarding local loops for which testing is to be conducted and may use such retrieved information to calculate attenuation thresholds. For example, when testing a particular local loop, the local loop testing system 102 may query a database of local loop information using, e.g., an identified assigned to the local loop. In response, the local loop testing system 102 may receive a line type, a line length, and other information regarding the local loop. The local loop testing system 102 may then calculate attenuation thresholds for each tone by multiplying the line length by one or more factors characterizing loss per unit of length based on the line type of the local loop and the particular tone frequency.

At operation 506, the local loop testing system 102 analyzes the attenuation data collected in operation 502. To do so, the local loop testing system 102 compares the attenuation data for each tone with the corresponding attenuation threshold for the tone obtained in operation 504. In implementations in which the attenuation thresholds correspond to maximum attenuation values, for example, the local loop testing system 102 will analyze the attenuation data to determine whether any tone represented in the attenuation data exceeds its respective attenuation threshold. Alternatively, if the attenuation thresholds instead represent normal attenuation values or normal attenuation ranges, the local loop testing system 102 may determine whether attenuation of each tone is within a tolerance about the normal attenuation value or within the normal attenuation range, respectively.

At operation 508, the local loop testing system 102 generates a test result based on the outcome of the analysis conducted during operation 506. In certain implementations, the test result may indicate, among other things, whether one or more tones exceeded their respective attenuation thresholds, the specific tones that exceeded their respective attenuation thresholds, the degree to which any attenuation thresholds were exceeded, and the like. The test results may then be transmitted and/or stored (operation 510). For example, in implementations in which the local loop testing system 102 initiates the attenuation analysis in response to a request from the portable testing unit 124 or the remote computing device 130 (which, as noted above, may correspond to a network operations center), the local loop testing system 102 may transmit the results to the portable testing unit 124 or the remote computing device 103, respectively. Alternatively, the local loop testing system 102 may transmit the test results to a database or similar data storage system for archiving and/or subsequent analysis.

The local loop testing system 102 may be configured to automatically initiate a more detailed impairment analysis in response to determining that one or more tones exceed their respective attenuation thresholds. For example, in response to determining the attenuation value for at least one tone exceeds its respective attenuation threshold, the local loop testing system 102 may automatically initiate an analysis of bits-per-tone data, as described above in the context of FIG. 2. The results of such analysis may also be incorporated into the test results of operation 508 for presentation to a user. As a result, the user may be simultaneously notified that an impairment likely exists on the local loop and may be provided with an automated diagnosis of what type of impairment is likely present.

In addition to the applications previously discussed herein, the test results and data generated by the local loop testing system 102 (including any tests results or data generated during testing for impairments or attenuation-based testing, as described herein) may be used by additional systems for various purposes. In one non-limiting example, the impairment and/or attenuation-related data may be accessed and used by a map generation tool to generate overlays or similar graphical elements. For example, the map generation tool may be configured to generate maps illustrating local loops within a geographic region. Based on the test results/data generated by the local loop testing system 102, the map generation tool may then color-code or otherwise visually differentiate each depicted local loop according to the presence of any impairments, the severity of any identified impairments, the magnitude of losses for the local loop, the degree to which losses for a loop deviates from expected/inherent loss, and or any other similar metric. A user may then be able to select a displayed local loop and drill-down to further review the underlying test results/data.

The description and illustrations of the local loop testing system 102 contained herein are not intended to be limiting. For example, the local loop testing system 102 may include a plurality of hardware, software, and/or firmware components operating together to provide the functionality attributed herein to the local loop testing system 102. For example, the local loop testing system 102 may be implemented, at least in part, by a cloud of computing platforms operating together to provide at least some of the functionality described herein as being performed by the local loop testing system 102. Similarly, the local loop testing system 102 may be in communication with one or more computing devices configured to perform at least a portion of the functionality described herein and attributed to the local loop testing system 102. For example, the local loop testing system 102 may be configured to obtain line performance data and to forward such data to a computing device communicatively coupled to the local loop testing system 102 to perform testing and analysis of the line performance data, including the bits-per-tone data contained therein. Accordingly, any functions described herein as being performed by the local loop testing system 102 instead by implemented in machine-readable instructions of a computing device in communication with the local loop testing system 102.

Some or all of the operations of steps described above as being performed by the local loop testing system 102 (e.g., the various operations included in the method 200 of FIG. 2 or method 500 of FIG. 5) may instead be performed by other devices including, without limitation, the DSLAM 104A, the portable testing unit 124, and the premise device 108B. For example, in one implementation, the DSLAM 104A may execute instructions to periodically collect and test line performance data to detect impairments. In response to detecting an impairment, the DSLAM 104A may transmit a notification, e.g., to the remote computing device 130, indicating the impairment such that remedial actions may be taken. Such applications of the present disclosure can be particularly advantageous in facilitating automated monitoring of local loops while significantly reducing the need for technicians and similar personnel to physically travel to and test particular local loops. Similar monitoring functionality may also be implemented in premise devices associated with particular local loops.

In another implementation, the testing functionality described herein may be implemented in the portable testing unit 124. For example, the portable testing unit 124 may be configured to probe a local loop to collect line performance data, generate a bit value string from bits-per-tone data included in the line performance data, test the bit value string using various bit value templates stored in memory of the portable testing unit 124, and to present test results to a user, e.g., on a display of the portable testing unit 124. As a result, the portable testing unit 124 may be substantially self-sufficient and capable of testing for impairments in local loops without requiring communication with a remote computing system, such as the local loop testing system 102 of FIG. 1.

Systems and methods according to the present disclosure generally include obtaining and analyzing bits-per-tone data for a local loop, identifying and quantifying attenuation and others changes observable in the bits-per-tone data, and identifying potential defects or issues associated with the local loop based on the assessments of the bits-per-tone data. Identifying issues associated with the local loop may include identifying one or both of a type and magnitude of the issue and its impact on operation of the local loop. Although not limited to any specific local loop defects/issues, at least certain implementations of the present disclosure may be used to identify one or more of electromagnetic interference (EMI), radio frequency interference (RFI), distance/range limitations, inadequate bonding and associated issues (e.g., corrosion), mismatched cable technologies/standards, crosstalk, bad connectors, twisted pairs, split pairs, cable-level issues, and incomplete grounding.

In at least certain implementations of the present disclosure, identifying and quantifying issues associated with a local loop may include applying various forms of advanced signal processing, channel decomposition, and machine learning. Such techniques may be applied to the bits-per-tone data for the local loop, but may also be applied to other data associated with the local loop, such as, but not limited to, signal-to-noise per subcarrier (SNR), quiet-line-noise per subcarrier (QLN), and channel characteristics function per subcarrier, e.g., Hlog data.

In general, implementations of the present disclosure include systems and methods for ingesting trace data corresponding to one or more local loops and analyzing the trace data to identify the presence and/or magnitude of defects in the local loops. In at least certain implementations, systems according to this disclosure may take additional action based on the outcome of such analyses including, but not limited, to generating reports or alerts and providing analysis information and recommended repair instructions/information to field technicians or other personnel.

Figure 6:
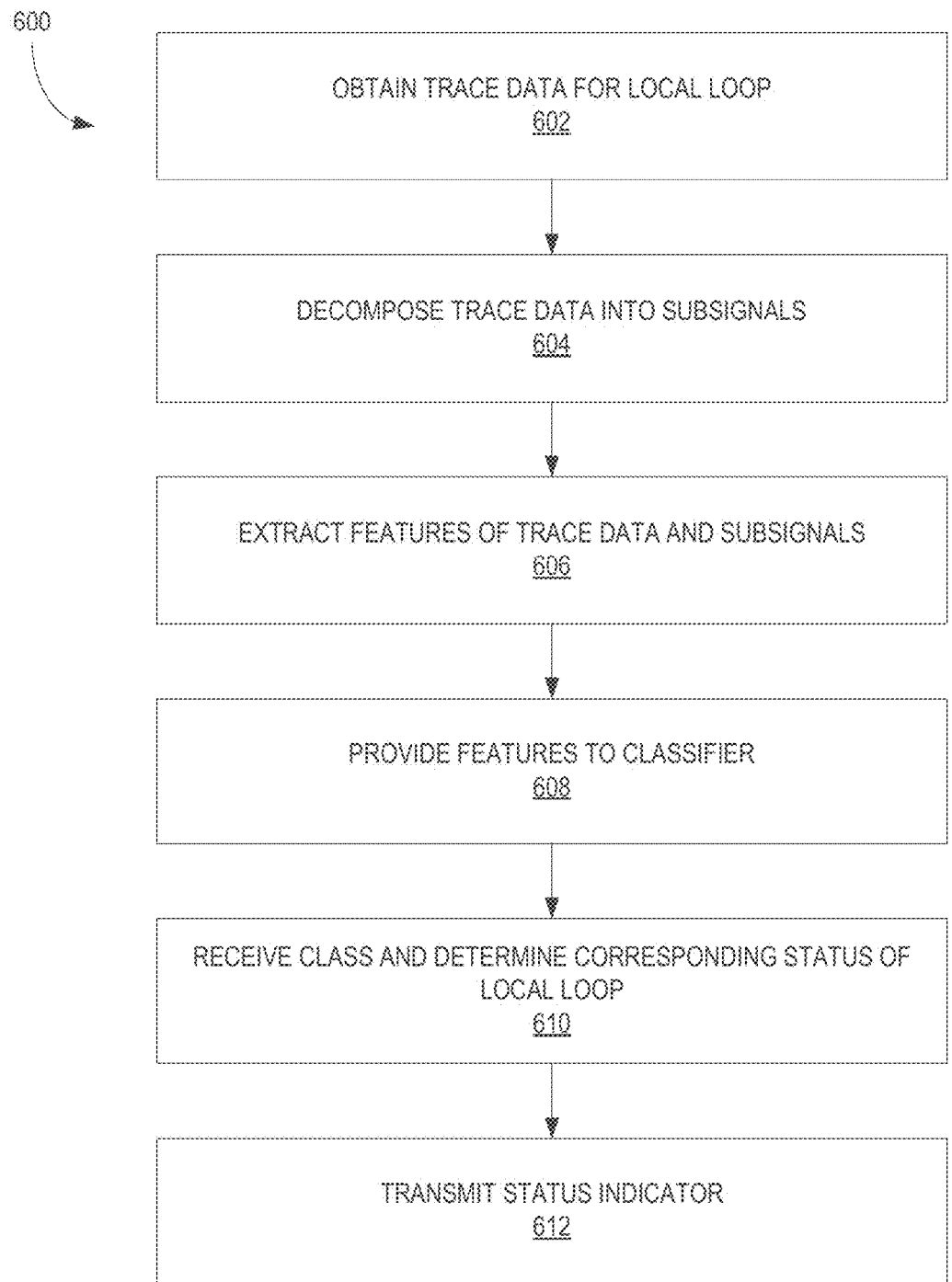
FIG. 6 illustrates a method for analyzing a local loop using trace data and that may be executed by a local loop testing system according to the present disclosure.

FIG. 6 is a flow chart illustrating a computer-implemented method 600 for analyzing local loops of a telecommunications network. Although not limited to network environment 100 illustrated in FIG. 1, the following discussion of method 600 includes references to network environment 100 and various element thereof. In at least certain implementations, method 600 may be executed by local loop testing system 102; however, in other implementations, method 600 may be executed by any suitable computing device having access to the data, models, etc. identified in the following discussion. Nevertheless, for purposes of the following discussion, method 600 is generally described as being executed by local loop testing system 102.

At operation 602, local loop testing system 102 obtains trace data for a local loop. As illustrated in FIG. 1, local loop testing system 102 may obtain trace data from various sources. In certain implementations, local loop testing system 102 may directly request or be provided trace data from network equipment of a local loop. For example, in the context of network environment 100 and in the context of analyzing local loop 106B, local loop testing system 102 may directly request or otherwise receive trace data from any of DSLAM 104A, premise device 108B, or any other equipment that may be incorporated into or coupled to local loop 106B. Notably, equipment coupled to local loop 106B may include temporary equipment, such as portable testing unit 124 (e.g., testing equipment of a technician assessing/repairing a local loop).

In other implementations, local loop testing system 102 may obtain trace data from a data source such as line performance data source 126. In general, line performance data source 126 may store historical data for one or more local loops and equipment of the one or more local loops. For example, line performance data source 126 may receive data from a data collection system (not pictured) configured to periodically interrogate or otherwise collect trace data from various pieces of equipment distributed throughout a telecommunications network and, in particular, trace data that may be associated with particular local loops. Accordingly, in certain implementations, local loop testing system 102 may obtain trace data by querying or otherwise accessing data stored in line performance data source 126 for one or more local loops of interest.

Obtaining trace data may further include processing/transforming data as provided by network equipment or as stored in line performance data source 126 into an alternative and more usable format. For example, as illustrated in FIG. 3, certain trace data may be provided to local loop testing system 102 as an unstructured block or "blob". In at least certain implementations, the blob may also have a non-numerical data type, such as a string. Accordingly, in such cases, obtaining trace data may further include structuring the obtained data and converting the obtained data into a format suitable for numerical analysis.

For example, the data represented in FIG. 3 is bits-per-tone data in the form of a long string with each character in the string indicating a quantity of bits measured for a respective tone. Accordingly, transforming the data of FIG. 3 may include generating an ordered data structure (such as a two-dimensional array, series of tuples, etc.) in which each element of the data structure includes a numerical representation of the tone (e.g., an integer corresponding to a frequency) and a numerical representation of the number of bits measured at that tone. Such data structures are intended merely as an example, and any suitable data structure that may be readily analyzed as described herein may be used instead.

Depending on the specific implementation, trace data obtained in operation 602 may include one or more of bits-per-tone data, SNR data, QLN data, and Hlog data. Accordingly, subsequent operations in method 600 corresponding to trace data may include performing the operations on any of one or more of bits-per-tone data, SNR data, QLN data, Hlog data, or any other form of available trace data.

In at least certain implementations, one or more type of trace data may not be available. Accordingly, in such implementations, local loop testing system 102 may generate synthetic trace data for unavailable trace data. For example, if only bits-per-tone data is available, local loop testing system 102 may generate each of SNR data, QLN data, and Hlog data (and/or any respective EOFs) using the bits-per-tone data. In certain implementations, local loop testing system 102 may generate the synthetic trace data by sequentially estimating the most probable shape of the missing trace data types based on characteristics/variables/features of the bits-per-tone data. In at least certain implementations, such computations of synthetic representatives may be further informed by the physical hierarchical position of the local loop/network equipment within the network (e.g., 'crowd-sourcing').

At operation 604, local loop testing system 102 decomposes the trace data from operation 602 into one or more subsignals. More specifically, local loop testing system 102 decomposes the trace data into subsignals that are indicative or may otherwise be analyzed to determine the presence of defects of the local loop.

In certain implementations, local loop testing system 102 may decompose the trace data by performing a singular spectral analysis (SSA) of the trace data. Generally, SSA is a type of time series analysis that can be used to decompose a signal into multiple subsignals/channels, with each subsignal corresponding to an independent and interpretable component of the original signal.

In the context of this disclosure, local loop testing system 102 may apply SSA to decompose the trace data into a smaller number of independent and interpretable elementary series, including noise. In one specific example, local loop testing system 102 may decompose the trace data into multiple elementary signals using embedding and singular value decomposition (SVD). Local loop testing system 102 may then group (e.g., by hierarchical clustering) and average (e.g., along a diagonal using a w-correlation matrix as a proximity matrix) into a smaller set of signals, referred to as empirical orthogonal functions (EOFs). For example, in one specific implementation, a set of 40 elementary signals may be grouped into a smaller set of 10 EOFs, with each EOF representing a meaningful functional subseries of the original trace data and being generally useful in isolating and detecting differences in signal subspaces. In the context of the current application, for example, local loop testing system 102 may generate EOFs useful in identifying specific defects of local loops.

As previously noted, trace data in the context of method 600 may be in various forms including bits-per-tone data, SNR data, QLN data, and Hlog data. Accordingly, local loop testing system 102 may decompose any or all such trace data into corresponding subsignals for subsequent analysis, as described herein.

At operation 606, local loop testing system 102 extracts features from the subsignals generated in operation 604. In general, the extracted features of the subsignals may be any suitable features of the subsignals that may be useful in identifying defects in local loops. Although implementations of the present disclosure are not specifically limited to certain features, the following discussion identifies several specific features that can be indicative of defects and issues in local loops.

For purposes of the following discussion, local loop testing system 102 is described as extracting trace data from one or both of "raw" trace data and EOFs of trace data. In general, raw trace data corresponds to the trace data obtained by local loop testing system 102 and subjected to decomposition in operation 604. As noted above, such trace data may include any of bits-per-tone data, SNR data, QLN data, Hlog data, or any other similar trace data. Accordingly, to the extent the following discussion mentions extracting features of raw data, such features are not limited to any specific type or form of trace data. Similarly, while EOFs generally refer to the subsignals generated by SSA, the term EOF in the following discussion is intended to more broadly refer to subsignals generated in operation 604. Accordingly, while the following discussion may refer to features of EOFs, such reference is intended to encompass any subsignal resulting from any decomposition process suitable for operation 604.

In one example implementation, features extracted by local loop testing system 102 from the trace data may include a spectral entropy. For example, local loop testing system 102 may compute spectral entropy based on the raw trace data and/or EOFs computed from the raw trace data. Local loop testing system 102 may then use the resulting spectral entropy data as a measure of spectral power distribution. Among other things, spectral entropy and spectral power distribution may be useful in detecting specific signal faults and degradation, including, but not limited to faults and degradation attributable to electromagnetic interference (EMI), radio frequency interference (RFI), corrosion, inadequate bonding, and incomplete grounding.

In another example implementation, features extracted by local loop testing system 102 may include local binary patterns within the raw trace data and/or the EOFs generated from the raw trace data. For example, local loop testing system 102 may reduce the raw trace data and/or the EOFs to binary (or other) symbolization (e.g., "+/−") using coarse graining.

In another example implementation, features extracted by local loop testing system 102 may include a degree of linearity. For example, local loop testing system 102 may statistically test the raw trace data and/or EOFs based on the raw trace data to calculate a degree of linearity across a range of tones. The resulting linearity metric may be useful, e.g., for detecting unexpected bandwidth loss.

In still another example implementation, features extracted by local loop testing system 102 may include an approximation of a linear trend of the raw trace data and/or EOFs based on the raw trace data. Again, such metrics may be useful in detecting unexpected bandwidth loss among other conditions.

In still another example implementation, features extracted by local loop testing system 102 may include a degree of nonlinearity exhibited by raw trace data and/or EOFs based on the raw trace data. Such metrics may be useful, e.g., for detecting multiple sources of signal irregularities, specifically EMI, RFI, inadequate bonding/corrosion, and incomplete grounding.

In another example implementation, features extracted by local loop testing system 102 may include a curvature of the raw trace data and/or EOFs based on the raw trace data. For example, local loop testing system 102 may compute curvature based on an orthogonal quadratic regression across tone frequencies. Such metrics may be useful in detecting unexpected bandwidth loss, among other things.

In another example implementation, features extracted by local loop testing system 102 may include a vanishing point of the raw trace data and/or EOFs based on the raw trace data. A vanishing point generally refers to the lowest tone frequency at which no signal can be transmitted. Accordingly, and among other things, vanishing points may be useful for detecting atypical distance-attenuation effects as well as anomalous discontinuities in signal strength.

In yet another example implementation, features extracted by local loop testing system 102 may include a stability of a mean of the raw trace data and/or EOFs based on the raw trace data. For example, local loop testing system 102 may calculate mean values for non-overlapping windows (e.g., frequency bands) across a range of supported frequencies and determine the extent to which the mean varies between such windows. Among other things, these metrics may be useful in detecting unexpected discontinuities in signal strength.

In another example implementation, features extracted by local loop testing system 102 may include a stability of a variance of the raw trace data and/or EOFs based on the raw trace data. Like the previous example, local loop testing system 102 may calculate variance for non-overlapping windows (e.g., frequency bands) across a range of supported frequencies and compare variances between the non-overlapping windows. In certain implementations, local loop testing system 102 may calculate variance using a leave-one-out approach across supported frequencies. Among other things, variance stability may be useful in detecting a presence and magnitude of signal interference.

In another example implementation, features extracted by local loop testing system 102 may include how often the raw trace data and/or EOFs based on the raw trace data crosses a median of the data. Such metrics may be useful in detecting both atypical distance-attenuation effects as well as anomalous discontinuities in signal strength.

In yet another example implementation, features extracted by local loop testing system 102 may include a fractional differencing order of the raw trace data and/or EOFs based on the raw trace data. For example, local loop testing system 102 may compute fractional differencing order to estimate a persistence of signal complexities across supported frequencies. Among other things, such these metrics may be useful for detecting multiple sources of signal discontinuities, including mixed technologies, cross talk, twisted pairs, and split pairs.

In another example implementation, features extracted by local loop testing system 102 may include a degree of volatility within the raw trace data and/or EOFs based on the raw trace data. For example, local loop testing system 102 may compute volatility using an autoregressive conditional heteroskedasticity model. To the extent such a model explains the corresponding data, such techniques may be useful for detecting the influence of alien frequencies contributing to bandwidth loss.

In another example implementation, features extracted by local loop testing system 102 may include a standard deviation of the first derivative of the raw trace data and/or EOFs based on the raw trace data. Such metric may be used, for example, to identify disruptive interferences and to detect the influence of strong and disruptive alien frequencies contributing to bandwidth loss.

In another example implementation, features extracted by local loop testing system 102 may include a peak frequency (e.g., a frequency with a highest value) and/or a trough frequency (e.g., a frequency with a lowest value) of the raw trace data and/or EOFs based on the raw trace data. Such metrics may be useful in detecting the influence of alien frequencies contributing to the bandwidth profile.

In another example implementation, local loop testing system 102 may determine a ratio of a purchased speed profile relative to an actual speed profile as indicated by the trace data. For example, local loop testing system 102 may compute such a ratio using Dual Path Optimization (DPO) logic. If the ratio is less than a predetermined threshold (e.g., 2), the local loop may be interpreted as having a defect causing the local loop to provide a lesser speed profile than intended or that should be possible over the local loop.

In another example implementation, local loop testing system 102 may determine a ratio of a purchased speed profile relative to a mathematical outcome of a loop quality evaluation indicating a maximum speed that a customer could physically obtain on the local loop. For example, if such a ratio is greater than 1 (e.g., the purchased speed profile exceeds the maximum speed), the local loop may be interpreted as being over-capacity. Similarly, if the ratio is less than 1 (e.g., the purchased speed profile is below the maximum speed), the local loop may be interpreted as being under-capacity.

The preceding discussion is intended to provide various examples of features that may be extracted from trace data obtained in operation 602 for a local loop. While the specific examples provided have clear utility in identifying and assessing defects in local loops, they are not exhaustive and other features are contemplated within the scope of the present disclosure. More generally, any qualitative or quantitative characteristics of the raw trace data and/or EOFs based on the raw trace data for a local loop may be extracted as a feature for use by local loop testing system 102 in assessing the local loop.

At operation 608, local loop testing system 102 provides the features extracted from the raw trace data and/or EOFs to a classifier or similar machine learning system. In general, the classifier receives the features as input and identifies a corresponding class for the local loop based on the received features using one or more models/algorithms.

At operation 610, local loop testing system 102 determines a status of the local loop based on the class identified in operation 608. For example, local loop testing system 102 may access a lookup table, database, matrix, or similar data structure that correlates classes output by the classifier with one or more defects that may be present on the local loop. Local loop testing system 102 may then perform a lookup or similar retrieval operation to determine the specific defect or defects that may be present in the local loop.

More generally, operation 608 and operation 610 correspond to a process in which features extracted from trace data are analyzed to determine whether defects are present in the local loop and, in certain implementations, the magnitude/severity of any such defects. The process noted above (e.g., providing features to a classifier to identify a class for the local loop and then performing a lookup or similar operation based on the class) is intended as an example only and other approaches are contemplated within the scope of this disclosure.

Figure 7:
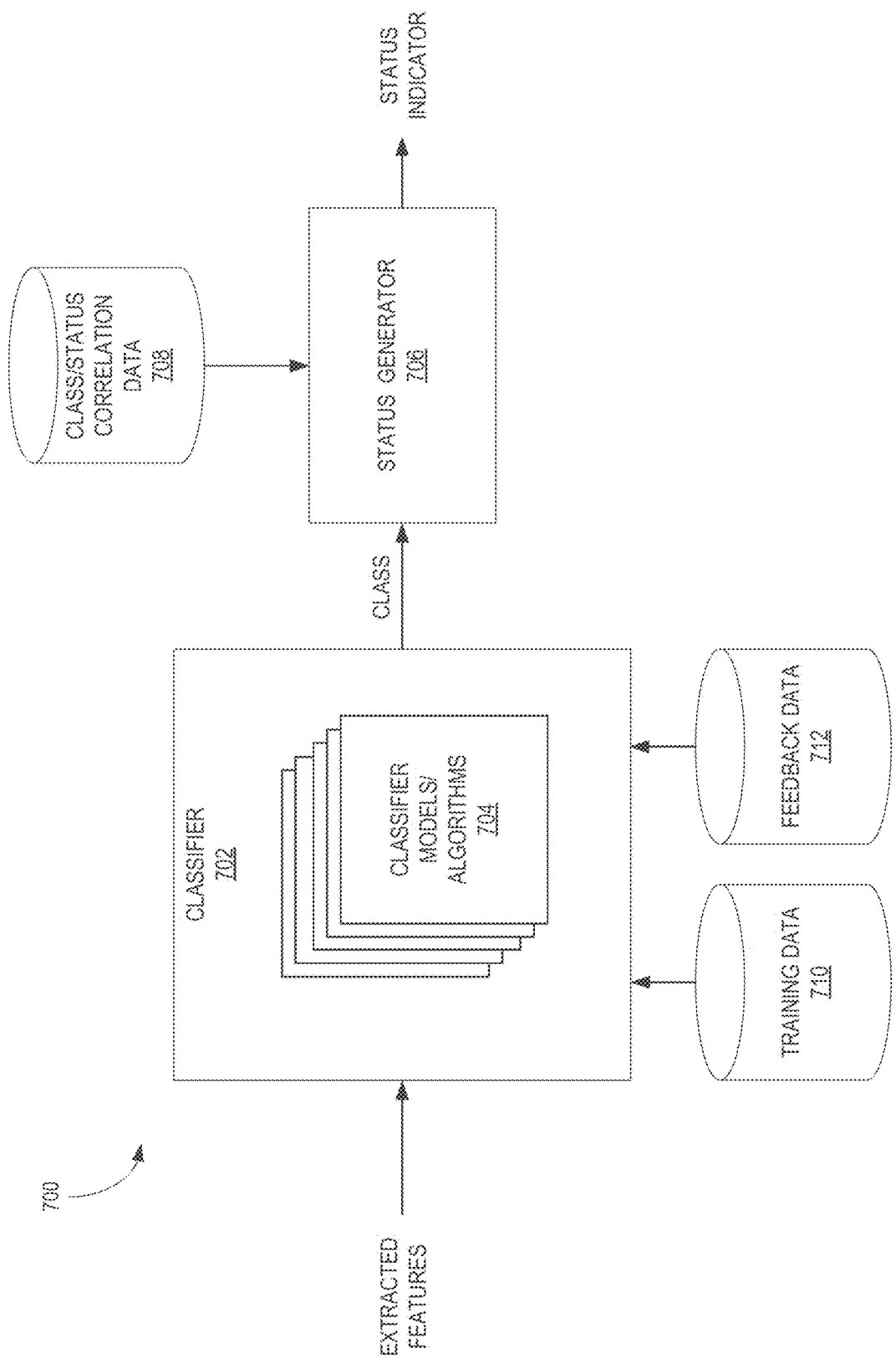
FIG. 7 is a block diagram illustrating a status identification system that may be used in the execution of the method of FIG. 6.

Nevertheless, FIG. 7 is a schematic illustration of a status identification system 700 according to the present disclosure and that may be generally implemented to perform operation 608 and operation 610. In certain implementations, status identification system 700 may be integrated with or may be otherwise accessible to local loop testing system 102 or other computing devices configured to analyze local loop trace data.

As illustrated, status identification system 700 includes a classifier 702 including one or more classifier models or algorithms (generally referred to herein as classifier models 704). Classifier 702 receives extracted trace data features and, using classifier models 704, identifies a class based on the extracted trace data features. Notably, the class identified by classifier 702 may simply indicate a group for the local loop of interest that includes other local loops having similar features. Accordingly, in certain implementations, classifier 702 provides the class to a status generator 706 that further generates a status indicator or similar meaningful interpretation of the class. For example, status generator 706 may access class/status correlation data 708 that, for each class that may be generated by 702, includes a code, list, identifier, etc., indicating potential defects in the classified local loop and their potential severity. So, for example, status generator 706 may receive a class from classifier 702 and retrieve a code from status class/status correlation data 708 based on the class. The code may then be interpreted (e.g., by local loop testing system 102, a remote technician device, etc.) to identify the defects.

In certain implementations, classifier models 704 may include multiple models, with each model being adapted to identify a class based on certain features. For example, classifier models 704 may include models for specific use with features for certain types of trace data (e.g., bits-pertone data). As another example, classifier models 704 may include certain models for use with features for raw trace data and other models for use with EOFs or similar subsignals based on raw trace data. In such implementations, classifier models 704 may further include specific models for use with specific EOFs/subsignals. In another example, classifier models 704 may include models specifically tailored to identifying certain defects in the local loop. Considering the foregoing, analyzing a local loop may include classifying extracted features using one or more of classifier models 704 and interpreting resulting classes provided by each such model.

Classifier 702 may be trained and refined using various data sets. For example, FIG. 7 includes training data 710, which may be provide to classifier 702 to train one or more of classifier models 704. In certain implementations, training data 710 may include historical data including features extracted from previous trace data for one or more local loops. Training data 710 may further include information regarding any specific defects identified in the one or more local loops. Accordingly, classifier 702 and status generator 706 may each be trained using training data 710 to identify appropriates statuses given certain features.

In at least certain implementations, classifier 702 and status generator 706 may also be trained/improved using feedback data 712 obtained following analysis by local loop testing system 102. For example, following an analysis of a local loop, local loop testing system 102 may provide information regarding specific defects that may be present in the local loop. A technician may then perform appropriate repairs and initiate a test of the local loop to determine whether the defect has been resolved. The outcome of the test along with any other relevant information (e.g., the features extracted from the trace data, the results of the analysis performed by local loop testing system 102, etc.) may then be stored in feedback data 712 for subsequent training and refinement of classifier 702 (including one or more of classifier models 704) and/or status generator 706.

Returning to FIG. 6, at operation 612, local loop testing system 102 transmits a status indicator based on the results of operation 610. The status indicator may be a message, value, signal, or any other form of transmission. In certain applications, when a computing device receives a status indicator, the computing device may present a corresponding status on a display of the computing device. For example, portable testing unit 124 may receive a status indicator from local loop testing system 102 corresponding to a status of a particular local loop. Portable testing unit 124 may then present the status using a display of portable testing unit 124. Presenting the status may include presenting a description of the status, presenting a visual indicator (e.g., a check mark or "X", colored circle, etc.) corresponding to the status, or any other suitable presentation for communicating the status of the local loop.

In certain implementations when a defect is present on the local loop, receiving a status indicator at portable testing unit 124 may also present recommendations, instructions, or other similar information for resolving any identified defects. For example, receiving a status indicator may cause portable testing unit 124 to display a link or similar control that may be activated by a user of portable testing unit 124 to access a manual, standard operating procedures, instructions, or similar information for resolving the defect. In other implementations, portable testing unit 124 may be integrated into a broader maintenance tracking system for tracking and resolving network issues. In such implementations, receiving a status indicator at portable testing unit 124 may cause portable testing unit 124 to initiate an interactive interface that guides the user of portable testing unit 124 through resolution of any defects.

In other implementations, the status indicator generated by local loop testing system 102 at operation 612 may also or alternatively be transmitted for storage at a database or similar data source with other relevant data to provide historical information regarding network performance and defects. In certain implementations, such information may then be accessed or otherwise used by a reporting system, a scheduling/dispatch system, or any other similar system for any suitable purpose related to monitoring and operation of a telecommunications network.

Notably, method 600 may be used alone or in combination with other techniques described herein. In certain implementations, information and analysis resulting from method 600 may be used to validate and/or supplement additional line performance metrics that may be generated using the techniques described above in the context of FIGS. 1-5 and method 500.

Local loop analysis data from multiple sources and generated using multiple techniques may be combined into a multidimensional space on which various data mining techniques may be applied. Among other things, data mining techniques may be used to identify recurrent patterns within the multidimensional space to facilitate recognition of specific defects and deficiencies in the performance and stability of a local loop or broader telecommunications network. For example, patterns within the multidimensional space may be considered defect labels or classes and may be used to identify composite patterns within raw trace data and EOFs based on raw trace data. As discussed above, such labels/classes may be required to facilitate human interpretation of the large-scale, multivariate trace data and feature data available for a local loop or telecommunications network and, in particular, may be used as a primary key for technical response guidance.

Considering the foregoing, status identification system 700 is more generally adapted to receive trace data (including features of trace data), and to label/classify the trace data using a series of algorithms/models. In certain implementations, the models may sequentially estimate class membership within each of multiple classes. In at least certain cases, status identification system 700 may also compute and provide an expression of confidence in class membership for any classes identified for the trace data.

In certain implementations of the present disclosure, local loop testing system 102 may also be configured to analyze trace data by comparing the raw trace data to a trace data template or similar model trace data. For example, local loop testing system 102 may compare the differential for a curve representing current trace data with that of a second local loop. Local loop testing system 102 may then determine a difference between the two differential values to generate an estimate of deviance between the current trace data and the exemplar (e.g., expressed as a percentage). So, for example, local loop testing system 102 may compare the area under a current bits-per-tone curve with that of an ideal bits-per-tone curve (or a corresponding value) to compute an approximate deviation between the current trace data and ideal trace data.

As noted above, in certain implementations, the trace data for the second local loop may correspond to an idealized version of the current local loop. Alternatively, the trace data for the second local loop may be based on historic trace data obtained from the current local loop. When historic trace data is used, comparing current trace data with historic trace data may be used to identify degradation due to onset of defects, improvements after defects have been removed, and the like.

The foregoing technique of comparing areas under trace data curves can be used to identify the presence and/or magnitude of defects in a local loop. For example, if the area under a current local loop curve deviates by a certain percentage from that of an idealized local loop, local loop testing system 102 may conclude that one or more defects is present in the current local loop and that the magnitude of the deviation between areas generally corresponds to the effect of the defects on performance of the local loop. Alternatively, if a local loop includes a known defect, comparison of areas may be used to quantify the impact of the known defect and, when repaired, the resulting improvement.

This disclosure contemplates that other benchmarking techniques may be used to analyze and assess performance of a local loop. In certain implementations, benchmarking may include comparing a speed or performance delivered to an end user to a speed or performance purchased by the end user. In other implementations, benchmarking may include comparing speed or capacity of a local loop against a more general performance benchmark. In at least certain cases, the performance benchmark may correspond to idealized form of the local loop. In other instances, the benchmark may consider physical or other constraints that may limit or otherwise impact performance of the local loop.

Figure 8:
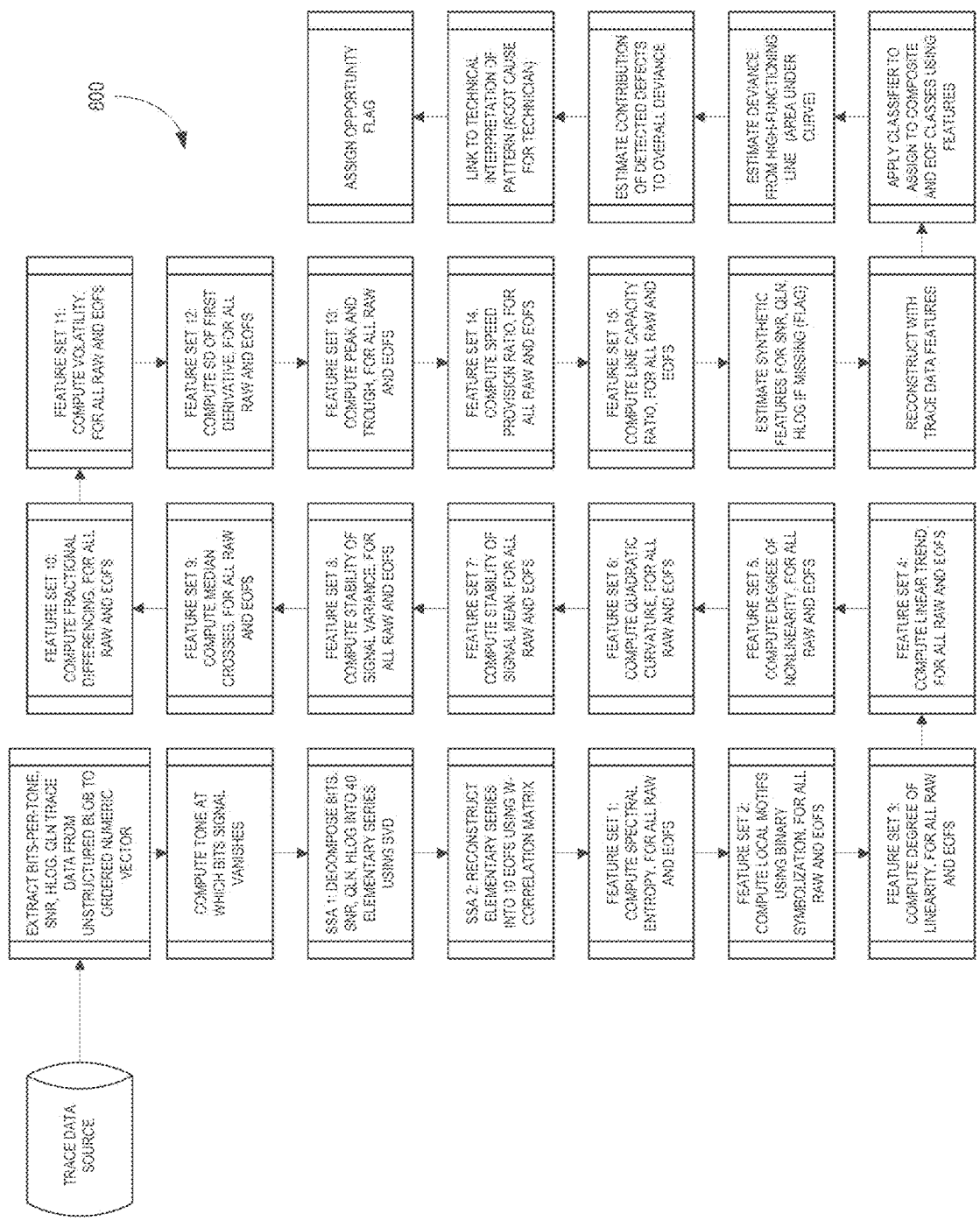
FIG. 8 illustrates an alternative method for analyzing a local loop according to the present disclosure.

FIG. 8 is a flow chart illustrating a method 800 for analyzing local loops of a telecommunications network in accordance with the present disclosure. Like method 600, method system 800 may be executed by a computing device of a computing device, such as local loop testing system 102 of FIG. 1. Nevertheless, in other implementations, method 800 may be executed by any suitable computing device having access to the data, models, etc. identified in the following discussion.

As illustrated in FIG. 8, method 800 generally begins with ingestion and processing of trace data from a trace data source. Such ingestion and processing may include, among other things, extracting various types of trace data from an unstructured blob to generate an ordered numeric vector. The trace data may then be decomposed and/or reconstructed into a set of subsignals. For example, in FIG. 8, a singular spectral analysis is first applied to decompose the trace data into a set of 40 elementary series using singular value decomposition. The elementary series are subsequently recombined into a set of ten EOFs using a w-correlation matrix. Notably, in at least certain implementations, initial processing of the trace data may include computing or otherwise identifying a vanishing point of the trace data.

Following processing of the trace data and generation of the EOFs, various features may be extracted from the trace data and the EOFs. For example, method 800 includes sequentially obtaining fifteen different "feature sets" from each of the raw trace data and EOFs generated from the raw trace data.

To the extent any particular types of trace data are missing, method 800 may further include estimating and reconstruction such trace data using available raw trace data, EOFs based on available raw trace data, and any features extracted or otherwise measurable from the raw trace data and/or EOFs.

A classifier may then be applied to the extracted features to assign a class to the trace data. Notably, in at least certain implementations, the classifier may include multiple classifier models/algorithms or multiple classifiers may be applied to the extracted features to identify multiple applicable classes corresponding to the extracted features. As noted herein, each class may generally correspond to a status of the local loop associated with the trace data such that local loops within a given class may generally exhibit the same or similar characteristics and, as a result, may be subject to the same or similar defects.

Method 800 further includes various benchmarking steps in which deviance from a high-functioning local loop/line is estimated. Method 800 further includes estimating the contribution of any defects of the local loop.

Following analysis of the trace data, a technical interpretation may be generated or otherwise provided, e.g., to a technician. Among other things, the technical interpretation may identify what, if any, defects may be present based on the class(es) assigned to the trace data. The technical interpretation may also facilitate access to relevant operating procedures, instructions, etc. for repairing the identified defect. For example, the technical interpretation may include a link, a document, a form, or similar resource that may be presented to and accessed by a technician to guide the technician through addressing the defect.

In certain implementations, local loops analyzed using method 800 may also be flagged or otherwise noted as potential opportunities for repair and improvement within the telecommunications network. Such flagging may include some form of prioritization based on various factors including, but not limited to, the impact of an identified defect on speed/capacity, the ease with which a given defect may be remedied, a quantity of customers (existing or potential) served by a local loop, and the like. Accordingly, a dispatch system or similar maintenance system for managing and organizing network repairs and upgrades may prioritize certain repairs based on how the corresponding local loops have been flagged.

Figure 9:
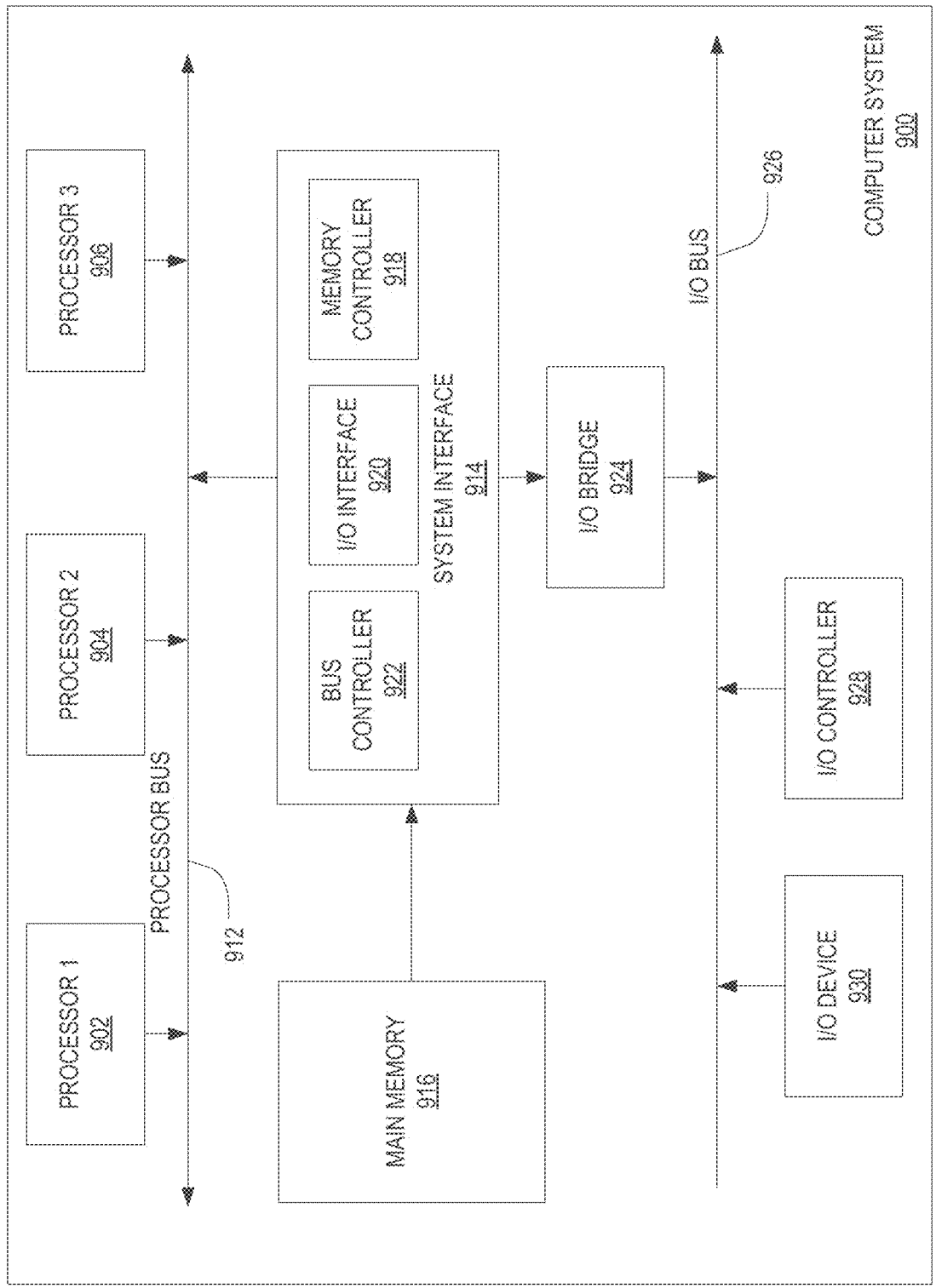
FIG. 9 is a block diagram illustrating an example of a computing device or computer system which may be used in implementations of the present disclosure.

FIG. 9 is a block diagram illustrating an example of a computing device or computer system 900 which may be used in implementations of the present disclosure. In particular, the computing device of FIG. 9 is one embodiment of any of the devices that perform one of more of the operations described above. For example, such devices may include any of the devices of the network environment 100 illustrated in FIG. 9 and, in particular, any of the local loop testing system 102, the DSLAMs 104A-104C, the premise devices 108A-108C, the portable testing unit 124, and the remote computing device 130.

The computer system 900 includes one or more processors 902-906. Processors 902-906 may include one or more internal levels of cache (not shown) and a bus controller or bus interface unit to direct interaction with the processor bus 912. Processor bus 912, also known as the host bus or the front side bus, may be used to couple the processors 902-906 with the system interface 914. System interface 914 may be connected to the processor bus 912 to interface other components of the system 900 with the processor bus 912. For example, system interface 914 may include a memory controller 918 for interfacing a main memory 916 with the processor bus 912. The main memory 916 typically includes one or more memory cards and a control circuit (not shown). System interface 914 may also include an input/output (I/O) interface 920 to interface one or more I/O bridges or I/O devices with the processor bus 912. One or more I/O controllers and/or I/O devices may be connected with the I/O bus 926, such as I/O controller 928 and I/O device 930, as illustrated.

I/O device 930 may also include an input device (not shown), such as an alphanumeric input device, including alphanumeric and other keys for communicating information and/or command selections to the processors 902-906. Another type of user input device includes cursor control, such as a mouse, a trackball, or cursor direction keys for communicating direction information and command selections to the processors 902-906 and for controlling cursor movement on the display device.

System 900 may include a dynamic storage device, referred to as main memory 916, or a random access memory (RAM) or other computer-readable devices coupled to the processor bus 912 for storing information and instructions to be executed by the processors 902-906. Main memory 916 also may be used for storing temporary variables or other intermediate information during execution of instructions by the processors 902-906. System 900 may include a read only memory (ROM) and/or other static storage device coupled to the processor bus 912 for storing static information and instructions for the processors 902-906. The system set forth in FIG. 9 is but one possible example of a computer system that may employ or be configured in accordance with aspects of the present disclosure.

According to one implementation, the above techniques may be performed by computer system 900 in response to processor 904 executing one or more sequences of one or more instructions contained in main memory 916. These instructions may be read into main memory 916 from another machine-readable medium, such as a storage device. Execution of the sequences of instructions contained in main memory 916 may cause processors 902-906 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 916. Common forms of a machine-readable media may include, but is not limited to, magnetic storage media; optical storage media (e.g., CD-ROM); magneto-optical storage media; read only memory (ROM); random access memory (RAM); erasable programmable memory (e.g., EPROM and EEPROM); flash memory; or other types of media suitable for storing electronic instructions.

Embodiments of the present disclosure include various operations, which are described in this specification. The steps may be performed by hardware components or may be embodied in machine-executable instructions, which may be used to cause a general-purpose or special-purpose processor programmed with the instructions to perform the operations. Alternatively, the operations may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for analyzing local loops of telecommunications networks, the method comprising:
    obtaining trace data for a local loop of a telecommunications network;
    decomposing the trace data to generate a subsignal;
    extracting features from the trace data and the subsignal; and
    providing the features to a classifier, wherein the classifier identifies a class of the local loop based on the features, wherein the class corresponds to a local loop status indicating a presence of a defect of the local loop, wherein the features include at least a standard deviation of a first derivative, and wherein the features correspond to the defect.

2. The computer-implemented method of claim 1, wherein the trace data includes at least one of bits-per-tone data, signal-to-noise ratio data, quiet-line-noise data, or hlog data.

3. The computer-implemented method of claim 1, wherein the subsignal is an empirical orthogonal function.

4. The computer-implemented method of claim 1, wherein the features further include at least one of:
    a spectral entropy;
    a local binary pattern;
    a degree of linearity;
    a linear trend;
    a degree of non-linearity;
    a curvature;
    a vanishing point;
    a stability of signal mean;
    a stability of signal variance;
    a median cross;
    a fractional differencing order;
    a volatility;
    a peak;
    a trough;
    a speed provision ratio; and
    a line capacity ratio.

5. The computer-implemented method of claim 1, further comprising transmitting an indicator corresponding to the status, wherein, when received by a computing device, the indicator causes the computing device to display the status and, when a defect is present, to provide access to technical information for resolving the defect.

6. The computer-implemented method of claim 1, wherein the classifier includes one or more machine learning models, and wherein providing the features to a classifier includes providing the features to each of the one or more machine learning models.

7. A computing device comprising:
    one or more data processors; and
    a non-transitory computer-readable storage medium containing instructions which, when executed by the one or more data processors, cause the one or more data processors to perform operations including:

obtaining trace data for a local loop of a telecommunications network;

decomposing the trace data to generate a subsignal;

extracting features from the trace data and the subsignal; and providing the features to a classifier, wherein the classifier identifies a class of the local loop based on the features, wherein the class corresponds to a local loop status indicating a presence of a defect of the local loop, wherein the features include at least a standard deviation of a first derivative, and wherein the features correspond to the defect.

8. The computing device of claim 7 wherein the subsignal is an empirical orthogonal function.

9. The computing device of claim 8 wherein the features further includes at least one of:

a spectral entropy, a local binary pattern, a degree of linearity, a linear trend, a degree of non-linearity, a curvature, a vanishing point, a stability of signal mean, a stability of signal variance, a median cross, a fractional differencing order, a volatility, a peak, a trough, a speed provision ratio, and a line capacity ratio.

10. The computing device of claim 7 wherein the trace data includes at least one of bits-per-tone data, signal-to-noise ratio data, quiet-line-noise data, or hlog data.

11. The computing device of claim 7 wherein the non-transitory computer-readable storage medium containing instructions which, when executed by the one or more data processors, cause the one or more data processors to transmit an indicator corresponding to the status, wherein, when received by a computing device, the indicator causes the computing device to display the status and, when a defect is present, to provide access to technical information for resolving the defect.

12. The computing device of claim 7 wherein the classifier includes one or more machine learning models, and wherein providing the feature to a classifier includes providing the feature to each of the one or more machine learning models.

13. A computer-program product tangibly embodied in a non-transitory machine-readable storage medium, including instructions configured to cause a computing device to perform operations including:

obtaining trace data for a local loop of a telecommunications network;

decomposing the trace data to generate a subsignal;

extracting features from the trace data and the subsignal; and providing the features to a classifier, wherein the classifier identifies a class of the local loop based on the features, wherein the class corresponds to a local loop status indicating a presence of a defect of the local loop, wherein the features include at least a standard deviation of a first derivative, and wherein the features correspond to the defect.

14. The computer-program product of claim 13, wherein the trace data includes at least one of bits-per-tone data, signal-to-noise ratio data, quiet-line-noise data, or hlog data.

15. The computer-program product of claim 13, wherein the subsignal is an empirical orthogonal function.

16. The computer-program product of claim 13, further comprising transmitting an indicator corresponding to the status, wherein, when received by a computing device, the indicator causes the computing device to display the status and, when a defect is present, to provide access to technical information for resolving the defect.

17. The computer-program product of claim 13, wherein the classifier includes one or more machine learning models, and wherein providing the features to a classifier includes providing the features to each of the one or more machine learning models.

* * * * *